US010198124B2

(12) United States Patent
Lee et al.

(10) Patent No.: US 10,198,124 B2
(45) Date of Patent: Feb. 5, 2019

(54) METHOD AND CIRCUIT FOR DRIVING TOUCH SENSORS AND DISPLAY DEVICE USING THE SAME

(71) Applicant: LG Display Co., Ltd., Seoul (KR)

(72) Inventors: Dukhyo Lee, Seoul (KR); Jaehun Jun, Seoul (KR); Hyeongwon Kang, Seoul (KR); Beomjin Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 93 days.

(21) Appl. No.: 15/393,166

(22) Filed: Dec. 28, 2016

(65) Prior Publication Data

US 2017/0108993 A1 Apr. 20, 2017

Related U.S. Application Data

(63) Continuation of application No. 14/981,313, filed on Dec. 28, 2015, now Pat. No. 9,569,035.

(30) Foreign Application Priority Data

Oct. 20, 2015 (KR) .................. 10-2015-0146056
Dec. 17, 2015 (KR) .................. 10-2015-0180985

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0416* (2013.01); *G06F 3/0412* (2013.01)

(58) Field of Classification Search
CPC ........................................... G06F 3/041–3/047
See application file for complete search history.

(56) References Cited

U.S. PATENT DOCUMENTS

| 9,024,913 | B1 | 5/2015 | Jung et al. |
|---|---|---|---|
| 2008/0309628 | A1 | 12/2008 | Krah et al. |
| 2012/0200524 | A1 | 8/2012 | Vallis et al. |
| 2013/0106779 | A1* | 5/2013 | Company Bosch .... G06F 3/044 345/174 |
| 2013/0249825 | A1 | 9/2013 | Kang et al. |
| 2013/0257765 | A1 | 10/2013 | Lee et al. |
| 2013/0293511 | A1 | 11/2013 | Nam |
| 2013/0335376 | A1 | 12/2013 | Lee |

(Continued)

FOREIGN PATENT DOCUMENTS

| EP | 2741184 A2 | 6/2014 |
|---|---|---|
| KR | 10-2015-0097407 A | 8/2014 |

OTHER PUBLICATIONS

European Extended Search Report, European Application No. 15201869.3, dated May 12, 2016, 9 pages.

(Continued)

*Primary Examiner* — Laurence J Lee
(74) *Attorney, Agent, or Firm* — Fenwick & West LLP

(57) ABSTRACT

Disclosed herein are a method and circuit for driving touch sensors and a display device using the same. A method of driving touch sensors includes supplying a touch sensor driving signal to the touch sensors or an amplifier and sensing a touch input during a touch input sensing portion and measuring current noise received through the touch sensors without the touch sensor driving signal during a noise measurement portion.

21 Claims, 23 Drawing Sheets

(56) References Cited

U.S. PATENT DOCUMENTS

| | | | |
|---|---|---|---|
| 2014/0022203 A1* | 1/2014 | Karpin | G06F 19/00 345/174 |
| 2014/0152617 A1 | 6/2014 | Kida et al. | |
| 2014/0160086 A1 | 6/2014 | Lee et al. | |
| 2014/0168151 A1* | 6/2014 | Noguchi | G06F 3/0412 345/174 |
| 2015/0035789 A1 | 2/2015 | Brunet et al. | |
| 2017/0102826 A1* | 4/2017 | Hamaguchi | G06F 3/044 |

OTHER PUBLICATIONS

United States Office Action, U.S. Appl. No. 14/981,313, dated Jun. 8, 2016, 17 pages.

\* cited by examiner

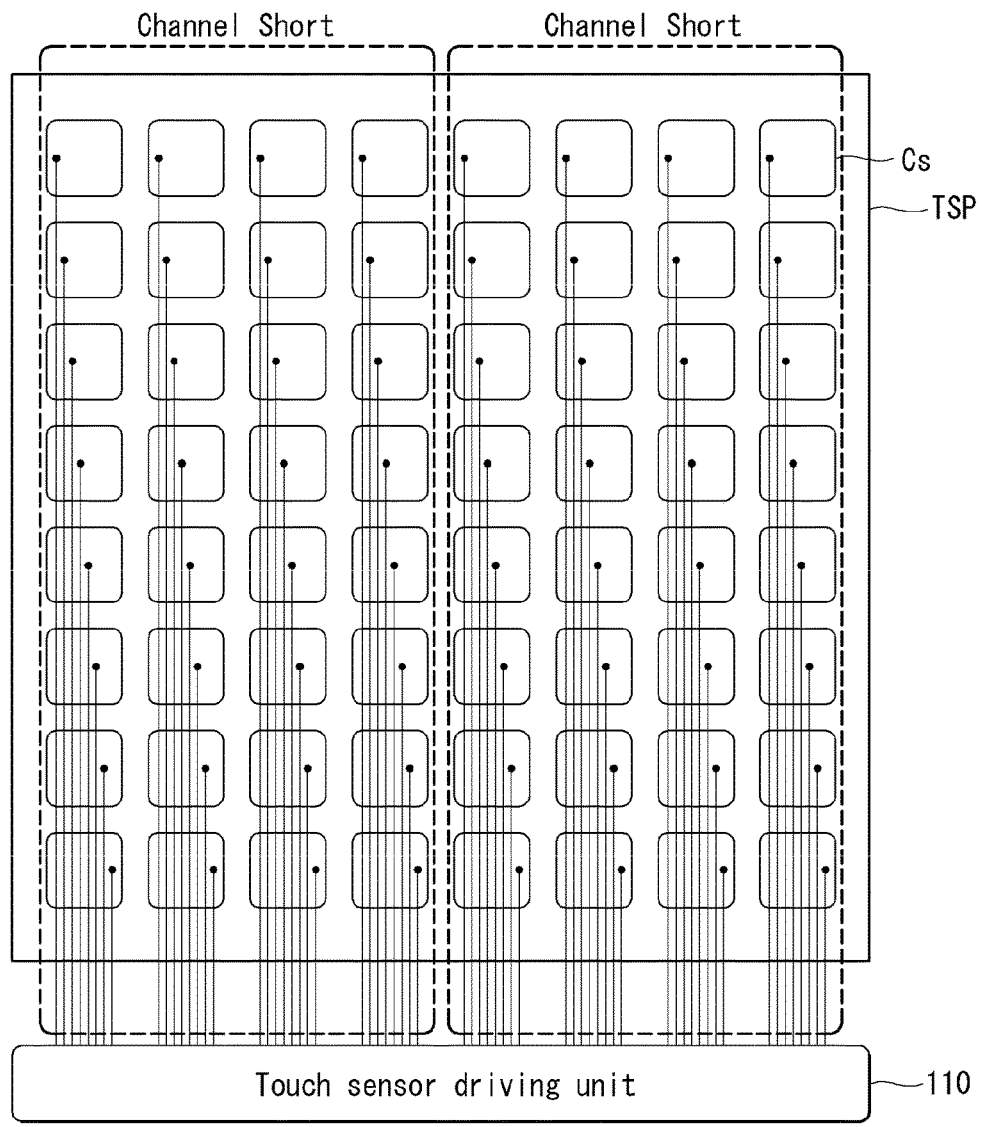

METHOD AND CIRCUIT FOR DRIVING TOUCH SENSORS AND DISPLAY DEVICE USING THE SAME

CROSS-REFERENCE TO RELATED APPLICATION

This application is a continuation of U.S. patent application Ser. No. 14/981,313 filed on Dec. 28, 2015, which claims priority to Republic of Korea Patent Application No. 10-2015-0146056, filed on Oct. 20, 2015, and Republic of Korea Patent Application No. 10-2015-0180985, filed on Dec. 17, 2015, the contents of which are all incorporated by reference herein in their entirety.

BACKGROUND

Field

The present disclosure relates to a method and circuit for driving touch sensors, wherein noise received through a finger or a conductor is measured, and a display device using the same.

Discussion of the Related Art

A user interface (UI) enables communication with a person (or user) using various electrical and electronic devices, so a user is able to easily control a device as the user wishes. Examples of the UI include a keypad, a keyboard, an on screen display (SOD), and a remote controller having an infrared communication or radio frequency (RF) communication function. A technology for the UI continues to be developed toward higher user sensitivity and manipulation convenience. The UI is evolving into a touch UI, a voice recognition UI, and a 3D UI.

A touch screen may be implemented using capacitance type touch sensors. In addition, a touch screen may be implemented using a resistive film, with an acoustic surface wave, a pressure type resistive film, and with infrared sensing. The most important factor to determine performance of such a touch screen is a signal to noise ratio (hereinafter referred to as an "SNR"). If noise introduced into a touch screen is reduced, the operation margin of a touch driving circuit can be widened and touch sensing sensitivity can be improved because an SNR value is increased.

In order to improve the SNR, a method of accurately measuring noise introduced into a touch sensor is important. Noise introduced into the touch sensor needs to be continuously measured because the noise varies in real time depending on a surrounding environment. There is known a method for improving the SNR in which the frequency of a touch sensor driving signal is changed to avoid a frequency associated with high noise. An example of such a method includes a method of changing the frequency of a touch sensor depending on the level of noise, which is disclosed in Korean Patent Application Publication No. 10-2012-0057009 (Jun. 5, 2012) of the present applicant.

A method of measuring noise in a touch sensor may include supplying a touch sensor driving signal to the touch sensor, converting output of the touch sensor when the touch sensor driving signal is supplied to the touch sensor into digital data, performing a comparison on data obtained by repeating such a method several times, and measuring noise affecting the touch sensor based on a difference between a minimum value and a maximum value according to a result of the comparison. As noise affecting a touch screen is greater, a difference between a minimum value and a maximum value is increased. However, such a noise measurement method requires a long measurement time and high current consumption because a touch sensor driving signal needs to be repeatedly applied to a touch sensor several times in order to measure noise.

SUMMARY

An embodiment of the present disclosure provides a method and circuit for driving touch sensors, which are capable of reducing the time taken to measure noise and current consumption in a touch screen, and a display device using the same.

A method of driving touch sensors according to an embodiment of the present disclosure includes supplying a touch sensor driving signal to the touch sensors or an amplifier and sensing a touch input during a touch input sensing portion and measuring current noise received through the touch sensors without the touch sensor driving signal during a noise measurement portion.

A touch sensor driving circuit according to an embodiment of the present disclosure includes an amplifier configured to amplify a signal on sensor lines connected to touch sensors, an integrator configured to integrate the output signal of the amplifier, a multiplexer configured to connect the sensor lines to the amplifier, and a touch sensor control unit configured to supply a touch sensor driving signal to the touch sensors or the amplifier and to sense a touch input during a touch input sensing portion and to measure current noise received through the touch sensors during a noise measurement portion. The touch sensor driving signal is not generated during the noise measurement portion.

A display device according to an embodiment of the present disclosure includes a display driving circuit configured to write the data of an input image in the pixels of a pixel array during a display period and a touch sensor driving circuit configured to drive touch sensors during a touch sensor driving period. The touch sensor driving circuit includes an amplifier, an integrator, a multiplexer, and a touch sensor control unit.

In one embodiment, a touch sensitive display device comprises a display panel comprising one or more touch sensors. The display device also includes touch driving circuitry, such as a touch driver integrated circuit (IC). The touch driving circuitry is configured to supply one or more touch driving signals to the one or more touch sensors and to sense touch and measure first electrical noise of the one or more touch sensors while the one or more touch sensor driving signals are not supplied to the one or more touch sensors.

In one embodiment, the display panel is driven in a display period for image display and a touch period for touch sensing. The touch driving circuitry supplies the one or more touch driving signals and senses touch during a touch sensing portion of the touch period. The touch driving circuitry also measures the first electrical noise during a noise measurement portion of the touch period.

In one embodiment, the touch driving circuitry is to measure second electrical noise of the one or more touch sensors while the one or more touch sensor driving signals are not supplied to the one or more touch sensors. The touch driving circuitry also compares the first electrical noise to the second electrical noise and adjusts an operating frequency of the touch driving circuitry based on the comparison.

In one embodiment, the first electrical noise is measured by the touch driving circuitry while the touch driving circuitry is operating at a first frequency. The second electrical noise is measured by the touch driving circuitry while the touch driving circuitry is operating at a second frequency different than the first frequency.

In one embodiment, the one or more touch sensors comprise a plurality of touch sensors. The touch driving circuit also comprises a circuit to selectively short together two or more of the plurality of touch sensors while the first electrical noise of the touch sensors is measured.

In one embodiment, the touch driving circuitry further comprises an amplifier to amplify a signal on one or more sensor lines connected to the one or more touch sensors and an integrator to integrate an output signal of the amplifier. The touch driving circuitry senses touch and measures noise based on an output of the integrator.

In one embodiment, the display device further comprises a first touch sensing line and a second touch sensing line. The device also comprises a differential amplifier having a first amplifier input and a second amplifier input, the first amplifier input coupled to the first touch sensing line, and a switching circuit to couple the second amplifier input to the second touch sensing line when touch is sensed, and to couple the second amplifier input to a reference voltage when noise is measured.

Other embodiments include a touch driving circuit, and a method of operating the display device.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings:

FIGS. 10A to 10F are diagrams showing examples of various channel short-circuits of the sensing unit during the noise measurement portion.

DETAILED DESCRIPTION

Figure 1:
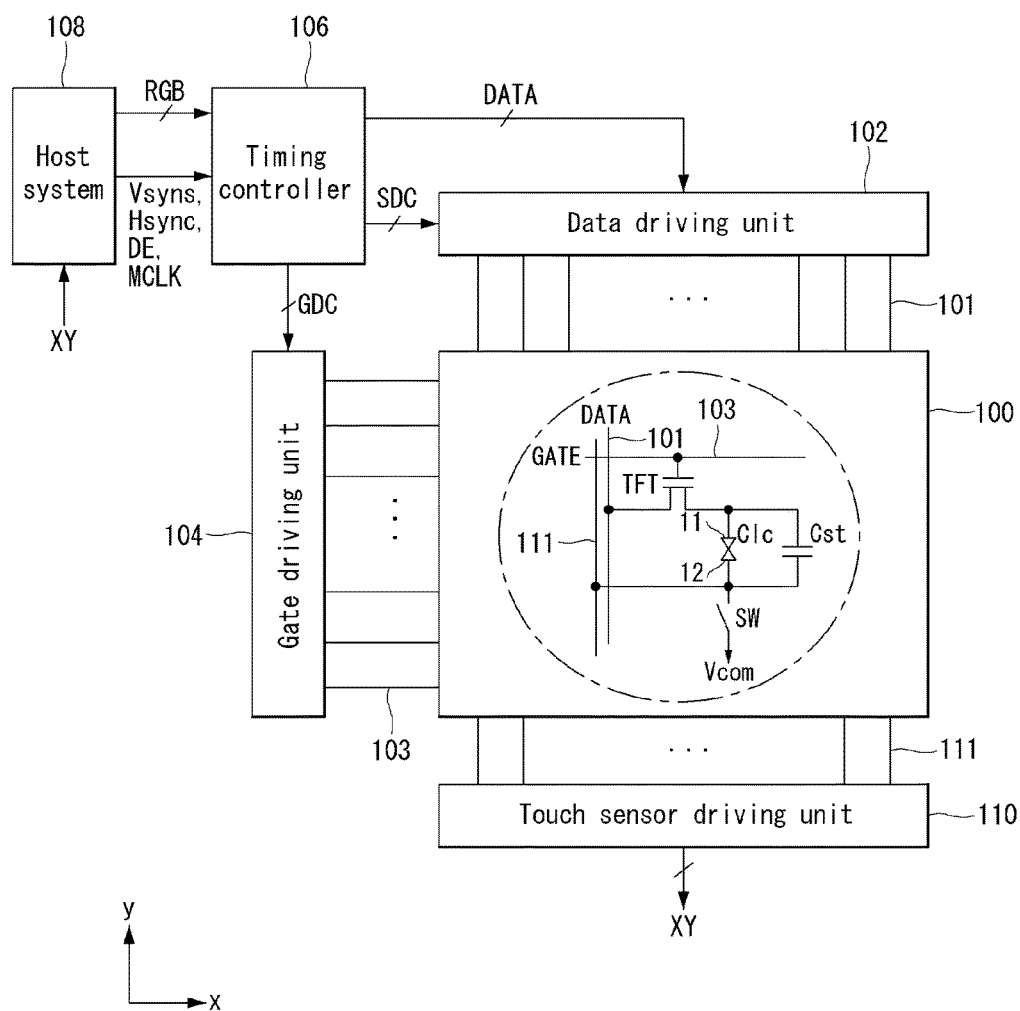
FIG. 1 is a diagram showing a display device according to an embodiment.

A display device according to an embodiment of the present disclosure may be implemented using a display device in which a touch screen may be included, for example, a flat panel display device, such as a liquid crystal display (LCD), a field emission display (FED), a plasma display panel (PDP), an organic light-emitting diode (OLED) display, or an electrophoresis display (EPD). In the following embodiments, an LCD is illustrated as being an example of a flat panel display device, but it is to be noted that a display device according to an embodiment of the present disclosure is not limited to an LCD.

A touch screen according to an embodiment of the present disclosure may be implemented using capacitance sensors. The capacitance sensor may be divided into a self-capacitance type touch sensor and a mutual capacitance type touch sensor.

The mutual capacitance type touch sensor includes a mutual capacitance Cm between two electrodes Tx and Rx. A circuit for driving the touch sensor applies a touch sensor driving signal (or stimulation signal) to a Tx touch sensing line, receives the charges of the mutual capacitance Cm through an Rx touch sensing line, and senses a touch input based on the amount of charges changed in the mutual capacitance Cm before and after the touch input. When a finger or a conductor approaches the mutual capacitance Cm, mutual capacitance is reduced. The touch sensor driving circuit senses a touch input using such a principle.

A self-capacitance type touch sensor according to an embodiment of the present disclosure includes a self-capacitance Cs formed in each of sensor electrodes. A circuit for driving the touch sensor supplies charges to the self-capacitances Cs and senses a touch input based on the amount of charges changed in the self-capacitances Cs before and after the touch input. When a conductor approaches the self-capacitance Cs, self-capacitance is increased. The touch sensor driving circuit senses a touch input using such a principle.

The touch sensor driving circuit time-divides a touch sensor driving period into a touch input sensing portion in which a touch input is sensed and a noise measurement portion for the touch sensor. In accordance with an embodiment of the present disclosure, during the noise measurement portion, two or more touch sensors are short-circuited, and noise is simultaneously measured through the short-circuited touch sensors, thereby reducing the time taken to measure noise and current consumption.

Hereinafter, embodiments of the present disclosure are described with reference to the accompanying drawings. In the specification, the same reference numerals denote substantially the same elements. In the following description, a detailed description of known functions or constructions related to the present disclosure will be omitted if it is deemed that such description would make the gist of the present disclosure unnecessarily vague.

Figure 2:
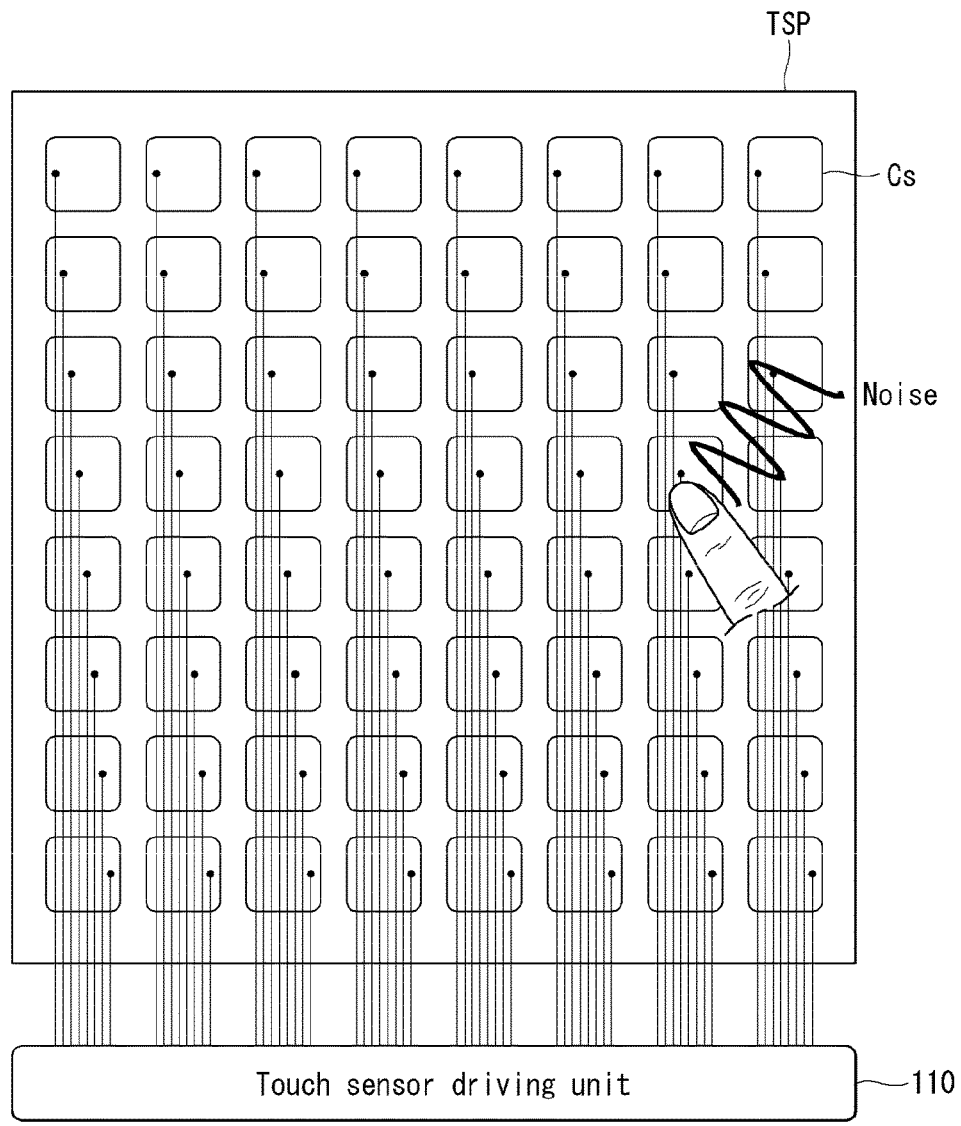
FIG. 2 is a diagram showing the electrode pattern of self-capacitance type touch sensors.
Figure 3:
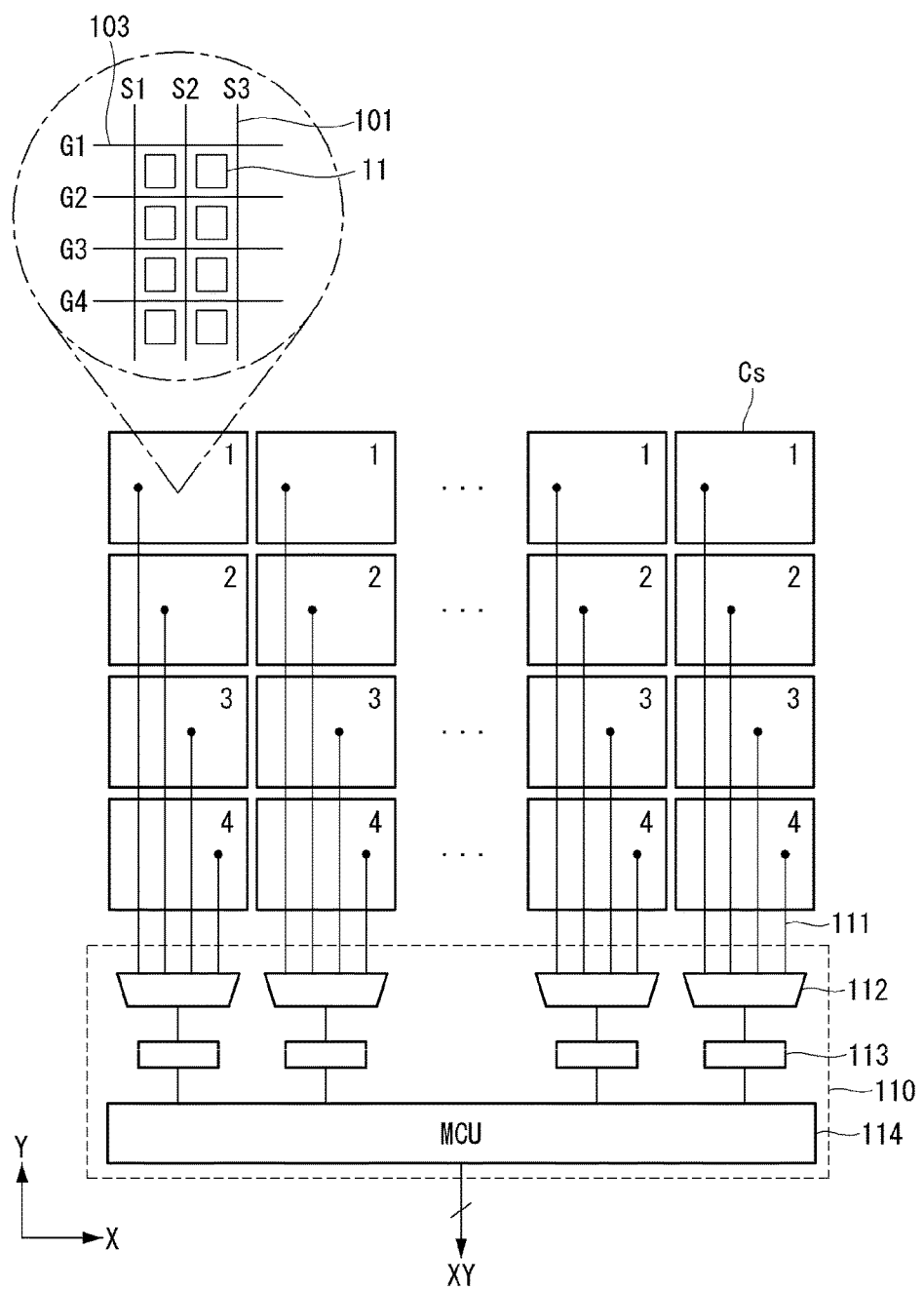
FIG. 3 is a diagram showing the configuration of a touch sensor driving unit.

Referring to FIGS. 1 to 3, a display device according to an embodiment includes a display panel 100, a display driving circuit 102, 104, and 106, and a touch sensor driving unit 110. A touch screen TSP includes capacitance type touch sensors.

The display panel 100 includes a pixel array for displaying an input image. Touch sensors Cs for implementing the touch screen TSP are disposed in the display panel 100. The touch sensors sense a touch input using mutual capacitance or self-capacitance.

The touch sensors may be bonded on the display panel 100. In some embodiments, the touch sensors, together with the pixel array, may be formed on the lower substrate of the display panel 100 and embedded in the display panel 100 in an in-cell type. Hereinafter, the touch sensors have been illustrated as being embedded in the display panel 100, but the present disclosure is not limited thereto. FIGS. 2 and 3 illustrate self-capacitance type touch sensors embedded in the display panel 100.

The pixel array of the display panel 100 includes pixels defined by data lines 101 and gate lines 103. The pixels are divided into a red sub-pixel R, a green sub-pixel G, and a blue sub-pixel B in order to implement respective colors. Each of the pixels may further include a white sub-pixel W. Each of the pixels includes a pixel electrode 11 supplied with a data voltage through a thin film transistor (TFT) disposed at the crossing of the data line 101 and the gate line 103, a common electrode 12 divided by the electrode pattern of the touch sensors Cs, and a storage capacitor Cst connected to the pixel electrode 11 and configured to maintain the voltage of a liquid crystal cell Clc. Sensor lines 111 for connecting the touch sensors Cs to the touch sensor driving unit 110 are disposed in the pixel array of the display panel 100. Liquid crystal molecules of the liquid crystal cell Clc are driven by an electric field generated due to a difference between a data voltage applied to the pixel electrode 11 and a common voltage Vcom applied to the electrode of the touch sensor Cs, and thus control the transmittance of the pixel in response to the data of an input image.

A black matrix and a color filter may be formed in the upper substrate of the display panel 100. The lower substrate of the display panel 100 may be implemented in a color filter on TFT (COT) structure. In this case, the color filter is disposed in the lower substrate of the display panel 100. A polarization plate is attached to each of the upper substrate and lower substrate of the display panel 100. An orientation film for setting the pre-tilt angle of liquid crystals is formed on the inside of the display panel that comes in contact with the liquid crystals. A column spacer for maintaining the cell gap of a liquid crystal layer is formed between the upper substrate and lower substrate of the display panel 100.

A backlight unit may be disposed under the backside of the display panel 100. The backlight unit is implemented using an edge type or direct type backlight unit, and it radiates light to the display panel 100. The display panel 100 may be implemented using any known liquid crystal mode, such as twisted nematic mode, vertical alignment mode, in-plane switching (IPS) mode, or fringe field switching (FFS) mode. In an emissive display device, such as an organic light-emitting diode display, a backlight unit is not required.

If the touch sensors Cs are embedded in the pixel array, 1 frame period is time-divided into one or more display periods (TD in FIG. 4A-C) in which the pixels are driven for display and one or more touch sensor driving periods (TT in FIG. 4A-C) in which the touch sensors Cs are driven for touch sensing. The touch sensors Cs supply a common voltage Vcom to the pixels during the display period TD and sense a touch input during the touch sensor driving period TT. The touch sensor driving period TT is divided into a touch input sensing portion (TT1 in FIG. 4A-C) in which a touch input is sensed and a noise measurement portion (TT2 in FIG. 4A-C) in which noise introduced into the touch sensors is measured.

The display driving circuit 102, 104, and 106 writes the data of an input image into the pixels of the display panel 100. The display driving circuit 102, 104, and 106 includes a data driving unit 102, a gate driving unit 104, and a timing controller 106.

The data driving unit 102 converts the digital video data DATA of an input image, received from the timing controller 106, into an analog positive/negative polarity gamma compensation voltage and outputs a data voltage. The data voltage output by the data driving unit 102 is supplied to the pixels through the data lines 101.

The gate driving unit 104 sequentially supplies the gate lines 103 with a gate pulse (or scan pulse) synchronized with the data voltage and selects a line of the display panel 100 in which the data voltage is written. The gate pulse swings between a gate high voltage VGH and a gate low voltage VGL. The gate high voltage VGH is set as a voltage higher than the threshold voltage of a TFT, but the gate low voltage VGH is set as a voltage lower than the threshold voltage of a TFT. The TFT is turned on when the gate high voltage VGH is applied to the gate of the TFT, and thus supplies the data voltage from a corresponding data line 101 to the pixel electrode 11.

The timing controller 106 sends the digital video data RGB of an input image, received from a host system 108, to the data driving unit 102. The timing controller 106 may generate white data W by calculating a white gain based on the digital video date RGB for each pixel using a known algorithm.

Figure 6:
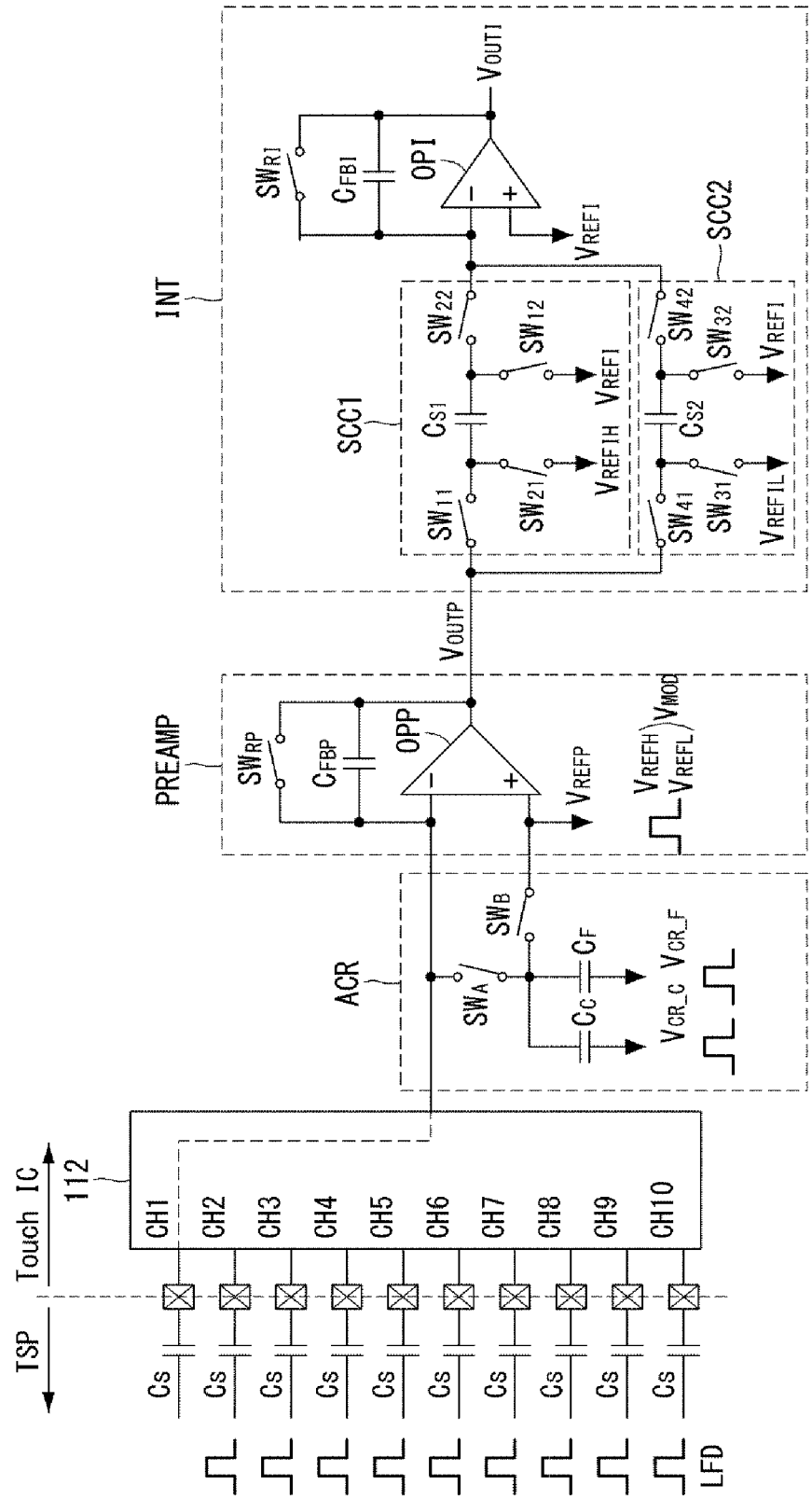
FIG. 6 is a circuit diagram showing the configuration of a sensing unit and an operation in the touch input sensing portion.

The timing controller 106 controls operating timing of the data driving unit 102, the gate driving unit 104, and the touch sensor driving unit 110 using timing signals, such as a vertical sync signal Vsync, a horizontal sync signal Hsync, a data enable signal DE, and a main clock MCLK received from the host system 108 in synchronism with the digital video data RGB of the input image. In FIG. 6, SDC is a data timing signal for controlling operating timing of the data driving unit 102. GDC is a gate timing signal for controlling operating timing of the gate driving unit 104. The timing controller 106 may generate a touch enable signal TEN for defining the display period TD and the touch sensor driving period TT using an input timing signal.

The host system 108 may be implemented using any one of a TV system, a set-top box, a navigator system, a DVD player, a Blu-ray player, a personal computer PC, a home theater system, and a phone system. The host system 108 includes a system on chip (SoC) in which a scaler is embedded and converts the digital video data RGB of an input image into data having a format suitable for resolution of the display panel 100. The host system 108 sends the timing signals Vsync, Hsync, DE, and MCLK to the timing controller 106 along with the digital video data RGB of the input image. Furthermore, the host system 108 executes an application associated with coordinate information XY about a touch input received from the touch sensor driving unit 110.

The touch sensor driving unit 110 includes circuitry that generates touch raw data (hereinafter referred to as "touch data") by converting the amount of charges of the touch sensors Cs into digital data. The touch sensor driving unit 110 calculates the coordinate values of each of touch inputs by executing a known touch sensing algorithm. The touch sensing algorithm compares touch data with a predetermined threshold value, determines a touch input based on a result of the comparison, adds identification code and coordinate information XY to each of such touch inputs, and sends the identification code and coordinate information XY to the host system 108.

Referring to FIG. 3, the sensing unit 113 changes a touch sensor driving frequency (or a sensing frequency) which varies depending on the level of noise of a touch sensor. The touch sensor driving unit 110 senses the amount of charges changed in the touch sensor using the touch sensor driving frequency. During the noise measurement portion, the touch sensor driving unit 110 measures the amount of charges, introduced through a finger or a conductor, through the touch sensors Cs, compares noise proportional to the amount of the charges with previous noise, and measures the level of the noise based on a result of the comparison.

The touch sensor driving unit 110 includes multiplexers (MUX) 112, sensing units 113, and a touch sensor control unit 114.

The multiplexer 112 reduces the number of channels of the touch sensor driving unit 110 by connecting the channels of the touch sensor driving unit 110 to the sensor lines 111 under the control of the touch sensor control unit 114.

The sensing unit 113 amplifies the amount of charges of the touch sensor using an amplifier, an integrator, and an analog-digital converter (hereinafter referred to as an "ADC") and sends it to the ADC. The ADC converts an analog signal, received from the integrator, into a digital value and outputs touch data.

The touch sensor control unit 114 executes a touch sensing algorithm in order to determine a touch input. The touch sensing algorithm compares touch data, received from the ADC of the sensing unit 113 during the touch input sensing portion, with a threshold value, determines the position of the touch input based on a result of the comparison, and outputs identification code and coordinate information XY corresponding to each of such touch inputs.

The touch sensor control unit 114 compares noise data (hereinafter referred to as "current noise"), received from the ADC of the sensing unit 113, with noise data measured in previous noise measurement portion (hereinafter referred to as "previous noise") during a noise measurement portion. The current noise and previous noise represent noise measured at different touch sensor driving frequencies. If, as a result of the comparison, the current noise is greater than the previous noise, the touch sensor control unit 114 changes a touch sensor driving frequency according to a predetermined rule. If, as a result of the comparison, the current noise is equal to or smaller than the previous noise, the touch sensor control unit 114 maintains the touch sensor driving frequency to a current frequency. The previous noise is stored in the memory of the touch sensor control unit 114 and delayed so that it is compared with the current noise. The touch sensor control unit 114 may be implemented using a micro control unit (hereinafter referred to as an "MCU").

Figure 4A:
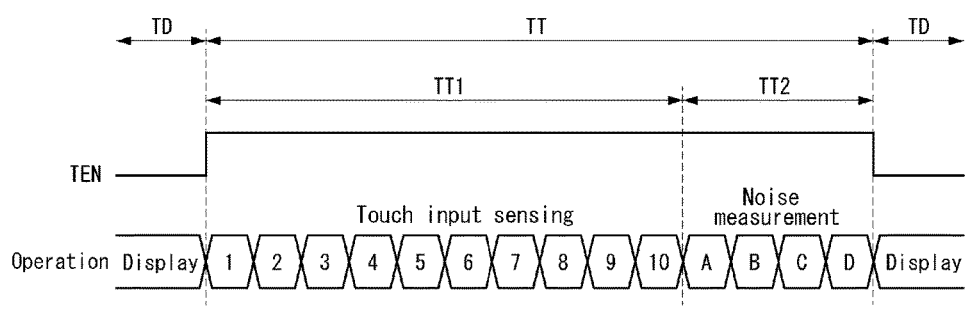
FIGS. 4A to 4C are diagrams showing a display period and a touch sensor driving period.
Figure 4B:
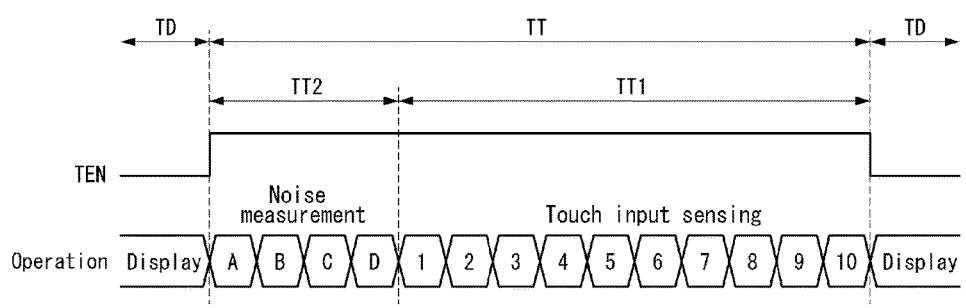
Figure 4C:
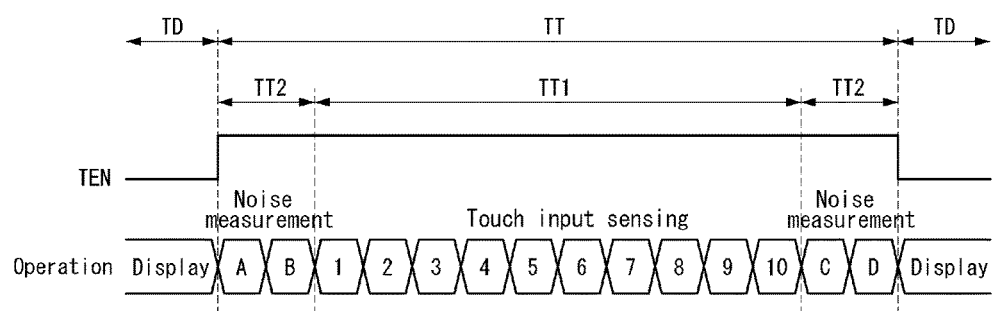
Figure 5:
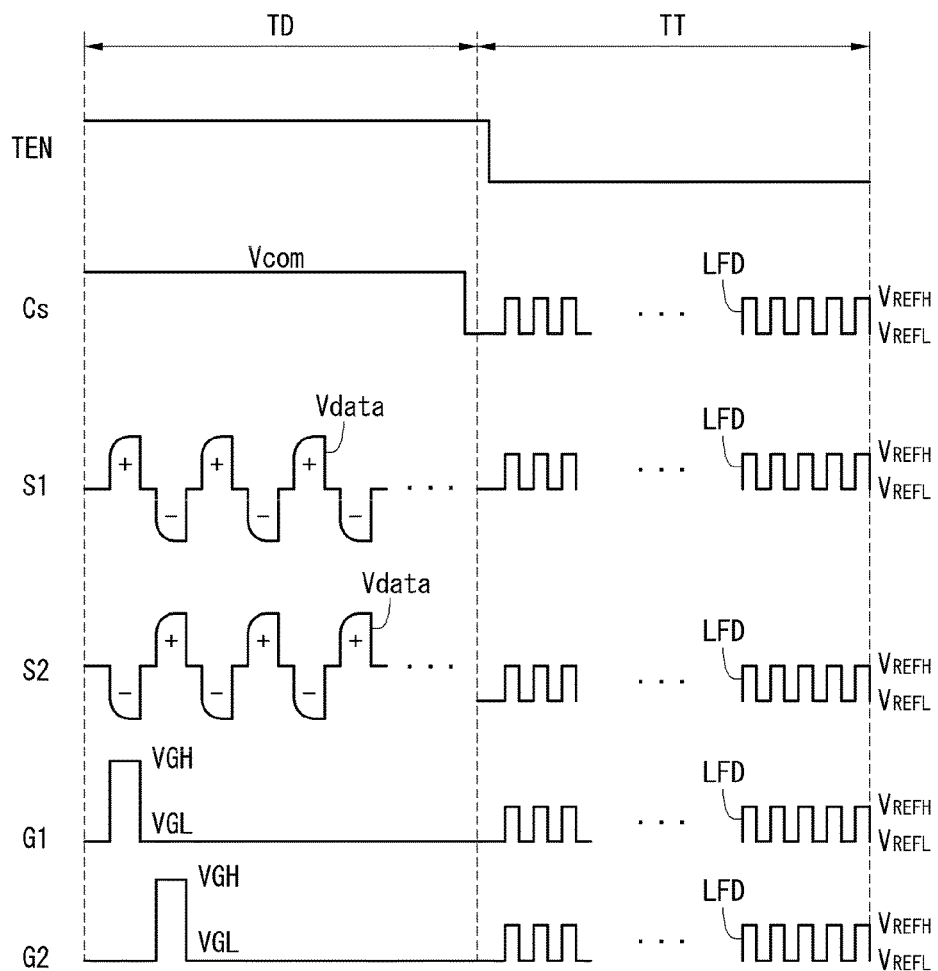
FIG. 5 is a waveform diagram showing signals applied to the signal lines of a pixel array during the display period and the touch sensor driving period.

FIGS. 4A to 4C are diagrams showing the display period TD and the touch sensor driving period TT. FIG. 5 is a waveform diagram showing signals applied to the signal lines of the pixel array during the display period and the touch sensor driving period. In FIGS. 5, S1 and S2 are data lines 101, and G1 and G2 are gate lines 103.

Referring to FIGS. 4A to 5, the display driving circuit 102, 104, and 106 writes the data of an input image in the pixels of the display panel 100 during the display period TD for image display. The touch sensor driving unit 110 does not sense a touch input during the display period TD in response to the touch enable signal TEN. The display driving circuit 102, 104, and 106 maintains a data voltage Vdata charged in the pixels during the touch sensor driving period TT.

The data driving unit 102 may supply an AC signal (LFD in FIG. 5) having the same phase as the touch sensor driving signal $V_{MOD}$ to the data lines 101 during the touch sensor driving period TT under the control of the timing controller 106. The voltage of the AC signal LFD may be set a voltage that is the same as the voltage of the touch sensor driving signal $V_{MOD}$. Parasitic capacitance between the data line 101 and a touch sensor Cs that is now being driven can be reduced due to such an AC signal LFD. In other embodiments, the data driving unit 102 may maintain output channels thereof to a high impedance state by blocking a current path between the output channels and the data lines 101 during the touch sensor driving period TT under the control of the timing controller 106.

The gate driving unit 103 may supply the AC signal (LFD in FIG. 5) having the same phase as the touch sensor driving signal $V_{MOD}$ to the gate lines 103 during the touch sensor driving period TT under the control of the timing controller 106. The voltage of the AC signal LFD may be set as the same or similar voltage having the same phase as the voltage of the touch sensor driving signal $V_{MOD}$. Parasitic capacitance between the gate line 103 and a touch sensor Cs that is now driven can be reduced due to such an AC signal LFD.

The AC signal LFD applied to the gate line may be set as a voltage level lower than that of the touch sensor driving signal $V_{MOD}$ because the TFT of the pixel needs to maintain an off state in the touch sensor driving period TT. For example, if the touch sensor driving signal $V_{MOD}$ has a voltage of 2 V to 8 V, the AC signal LFD applied to the gate line may have a voltage of −10 V to −4 V. In this case, the AC signal applied to the gate line has a lower voltage level than the touch sensor driving signal $V_{MOD}$, but has the same phase as the touch sensor driving signal $V_{MOD}$. Accordingly, parasitic capacitance can be reduced only when the AC signal and the touch sensor driving signal $V_{MOD}$ are set as the same variation size.

In other embodiments, the gate driving unit 103 may maintain output channels thereof to a high impedance state by blocking a current path between the output channels and the gate lines 103 during the touch sensor driving period TT under the control of the timing controller 106.

In an in-cell touch sensor technology, a common electrode connected to the pixels of the display panel 100 is divided for each touch sensor and used as the electrodes of the touch sensors Cs. For example, as described above, in the in-cell touch sensor technology, in the case of a liquid crystal display device, the common electrode 12 is divided, and the divided common electrode patterns are used as the electrodes of the self-capacitance type touch sensors Cs, such as FIGS. 2 and 3. Such touch sensors are coupled with the pixels, thereby increasing parasitic capacitance between the touch sensors and the pixels. The touch sensors and the pixels may be mutually subjected to a bad influence electrically because they are coupled through parasitic capacitance. Accordingly, the pixels and the touch sensors are subjected to time-division driving as shown in FIG. 4. Even in a time-division driving method, the touch sensitivity and touch recognition accuracy of the touch sensors may be reduced due to parasitic capacitance of the display panel 100.

If the AC signal LFD having the same phase as the touch sensor driving signal $V_{MOD}$ is supplied to the data lines 101 and gate lines 103 of the display panel 101 during the touch sensor driving period TT, the amount of charges in the parasitic capacitance of the display panel 100 can be reduced. The reason for this is that the amount of charged parasitic capacitance can be minimized by minimizing a voltage difference across the parasitic capacitance.

The AC signal LFD and the touch sensor driving signal $V_{MOD}$ swings between a high voltage $V_{REFH}$ and a low voltage $V_{REFL}$. The high voltage $V_{REFH}$ is set as a voltage lower than the gate high voltage VGH and the threshold voltage of the TFT of a pixel, thus preventing a phenomenon in which the TFT of the pixel is unwontedly turned on in the touch sensor driving period TT. The touch sensor driving signal $V_{MOD}$ may be differently set depending on the design specification of a panel. That is, the touch sensor driving signal $V_{MOD}$ may be set as a proper voltage level by taking into consideration voltages for a panel, such as VCC, VDD, a common voltage, a data driving voltage, and a gate voltage.

The touch sensor driving unit 110 may supply the AC signal LFD having the same phase as the touch sensor driving signal $V_{MOD}$ to touch sensors other than touch sensors that are now driven during the touch sensor driving period TT. Parasitic capacitance between the electrodes of the touch sensors that are now driven can be reduced due to such an AC signal LFD.

The touch sensor driving unit 110 supplies the electrodes of the touch sensors Cs with the common voltage Vcom of the pixels through the sensor lines 100 during the display period TD. The touch sensor driving unit 110 senses a touch input during the touch input sensing portion TT1 of the touch sensor driving period TT. The multiplexer 112 senses a touch input under the control of the touch sensor control unit 114 and selects the touch sensors Cs for each channel. The sensing unit 113 is connected to the touch sensors Cs through the multiplexer 112 and senses the amount of charges before and after a touch input to the touch sensors. In FIGS. 3 to 4C, numbers 1-10 are the touch sensors Cs connected to the multiplexer 112 according to respective channels. For example, if the multiplexer 112 is a 1:10 multiplexer, the multiplexer 112 connects the touch sensors of a first group to the sensing unit 113 through a first channel CH1 and then connects the touch sensors of second to tenth groups to the sensing unit 113 by sequentially connecting second to tenth channels CH2-CH10 to the sensing unit 113 during the touch input sensing portion TT1.

The touch sensor driving unit 110 measures noise applied to a touch sensor Cs through a finger or a conductor during the noise measurement portion TT2 of the touch sensor driving period TT and changes a touch sensor driving frequency in response to the level of the noise.

The sensing unit 113 changes a touch sensor driving frequency which varies in response to the level of noise of a touch sensor. The touch sensor driving unit 110 senses the amount of charges changed in a touch sensor at the touch sensor driving frequency. The touch sensor driving unit 110 measures the amount of charges, introduced through a finger or a conductor, through the touch sensors Cs during the noise measurement portion TT2, compares noise proportional to the amount of the charges with previous noise, and measure the level of the noise based on a result of the comparison.

The touch sensor driving unit 110 generates the coordinates of a touch input at a predetermined touch report rate. The touch sensor driving unit 110 may output the noise measurement value of a touch sensor at the report rate of a frequency, such as a touch report rate, but the present disclosure is not limited thereto.

The noise measurement portion TT2 may be disposed after the touch input sensing portion TT1 as shown in FIG. 4A or may be disposed before the touch input sensing portion TT1 as shown in FIG. 4B within the touch sensor driving period TT. The noise measurement portion TT2 may be divided into two parts and disposed both before and after the touch input sensing portion TT1 within the touch sensor driving period TT as shown in FIG. 4C. The noise measurement portion TT2 may be divided into a plurality of sub-portions A-D.

The same touch sensor driving frequency may be set in the portion A, portion B, portion C, and portion D. In some embodiments, different touch sensor driving frequencies may be set in the portions A, B, C, and D. The touch sensor driving unit 110 measures noise applied to the touch sensors during the noise measurement portion TT2, compares the current noise with previous noise, and changes a touch sensor driving frequency to a different frequency if the current noise is greater than the previous noise. The touch sensor driving unit 110 may change the touch sensor driving frequency in the noise measurement portion TT2.

Figure 7:
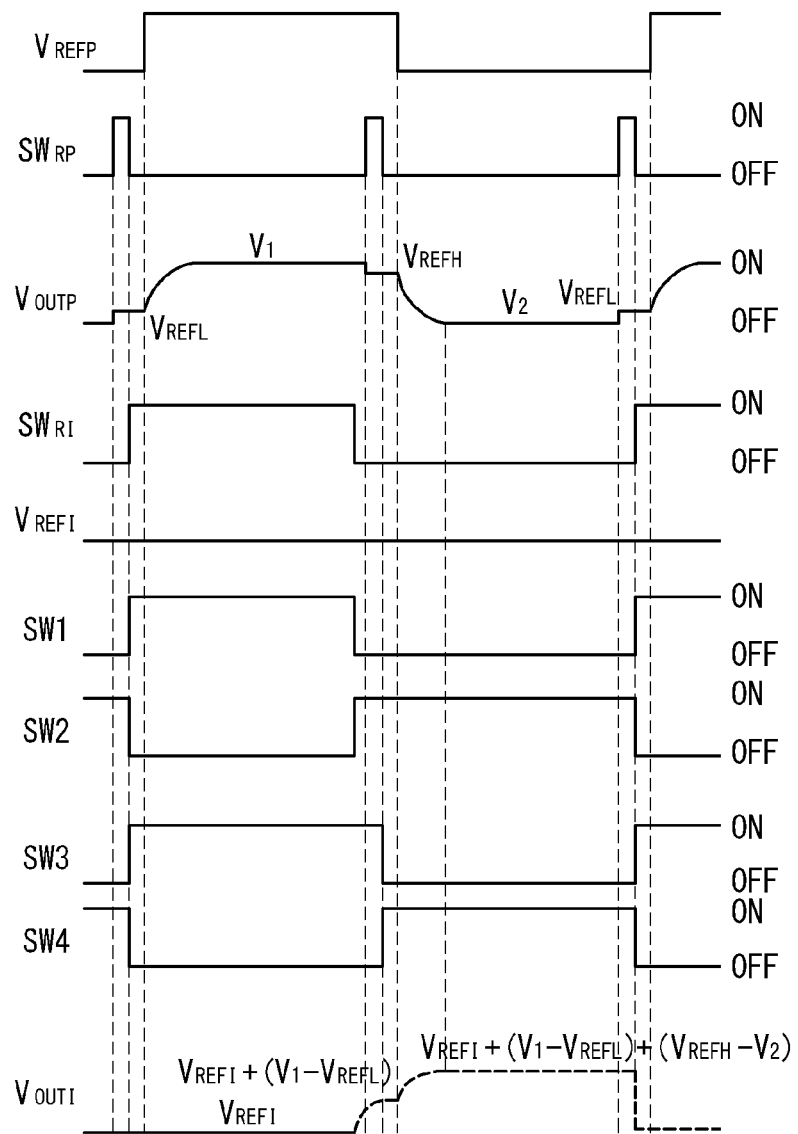
FIG. 7 is a waveform diagram showing the operation of an integrator shown in FIG. 6.
Figure 8:
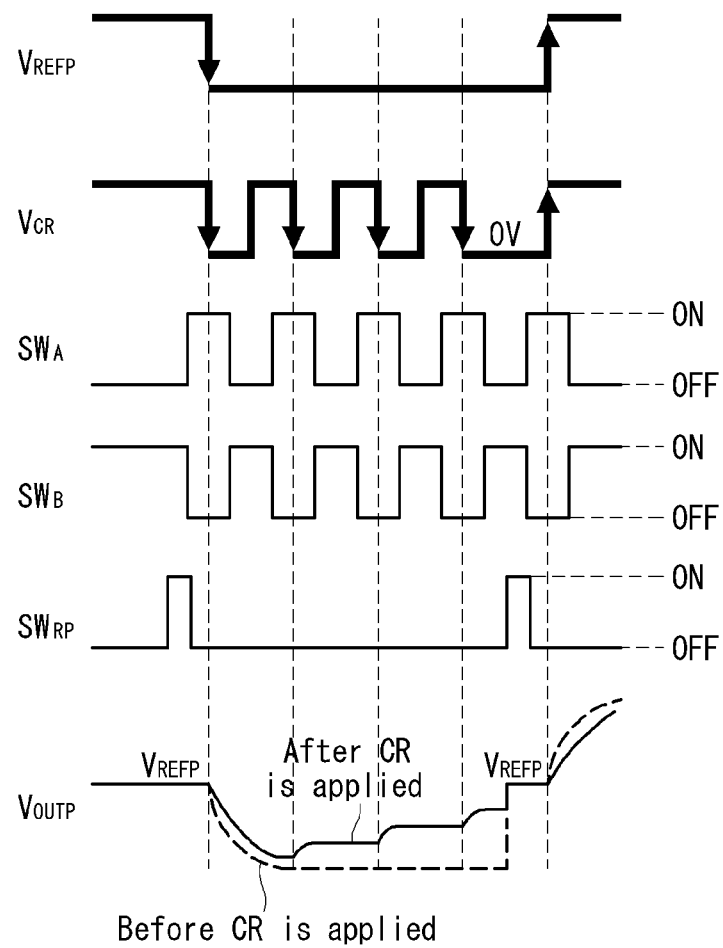
FIG. 8 is a flowchart illustrating the operation of a charge removal unit shown in FIG. 6.

FIGS. 6 to 8 are diagrams showing the operation of the touch sensor driving unit 110 in the touch input sensing portion TT1.

FIG. 6 is a circuit diagram showing the configuration of the sensing unit 113 and an operation in the touch input sensing portion. An example of FIG. 6 shows an operation of sensing, by the sensing unit 113, a touch input through the touch sensors Cs connected to the first channel CH1. In this case, the AC signal LFD having the same phase as the touch sensor driving signal $V_{MOD}$ is supplied to the sensor lines 111 connected to the remaining channels CH2-CH10 other than the first channel CH1. FIG. 7 is a waveform diagram showing the operation of the integrator INT shown in FIG. 6. FIG. 8 is a flowchart illustrating the operation of a charge removal unit shown in FIG. 6. The circuit configuration of the sensing unit 113 is not limited to FIG. 6. In FIG. 6, TSP is the touch screen formed of the touch sensors Cs. A touch IC means an integrated circuit (IC) in which the touch sensor driving unit 110 is located.

Referring to FIGS. 6 to 8, the analog circuit of the sensing unit 110 includes a pre-amplifier PREAMP and the integrator INT. The ADC (not shown) is connected to the output terminal of the integrator INT.

The pre-amplifier PREAMP amplifies a signal on the sensor lines 111 connected to the touch sensors Cs. The pre-amplifier PREAMP may amplify the amount of charges in the rising portion of the touch sensor driving signal $V_{MOD}$. The touch sensor control unit 114 supplies the touch sensor driving signal $V_{MOD}$ to the inverting input terminal − of the pre-amplifier PREAMP in the touch input sensing portion TT1 and supplies a specific DC reference voltage VREFL to the inverting input terminal − of the pre-amplifier PREAMP in the noise measurement portion TT2.

A charge removal unit ACR may be connected to the input terminal of the pre-amplifier PREAMP. The charge removal unit ACR properly reduces the amplitude of a change of touch sensor signals. The charge removal unit ACR may be omitted.

In the case of the self-capacitance type touch sensor Cs, the touch sensor driving signal $V_{MOD}$ is applied to a reference voltage terminal, that is, the inverting input terminal + of the pre-amplifier PREAMP as shown in FIG. 6. In the case of a mutual capacitance type touch sensor Cm, such as FIGS. 12 to 14, the touch sensor driving signal $V_{MOD}$ is directly applied to a Tx line.

The pre-amplifier PREAMP includes a first amplifier OPP, a feedback capacitor $C_{FBP}$, and a reset switch $SW_{RP}$. The first amplifier OPP may be a single-ended amplifier as shown in FIG. 6. The feedback capacitor $C_{FBP}$ and the reset switch $SW_{RP}$ are coupled in parallel between the inverting input terminal − and output terminal of the first amplifier OPP. The touch sensor driving signal $V_{MOD}$ is supplied to the non-inverting input terminal + of the first amplifier OPP as the reference voltage $V_{REFP}$. The touch sensor driving signal $V_{MOD}$ swings between the high voltage $V_{REFH}$ and the low voltage $V_{REFL}$. Since charges are supplied to the touch sensor Cs due to the touch sensor driving signal $V_{MOD}$, the amount of charges of the touch sensor Cs before and after a touch input can be different. If the charge removal unit ACR does not operate, the output voltage $V_{OUTP}$ of the pre-amplifier PREAMP is expressed by Equation 1.

$$V_{OUTP} = V_{MOD} \times \left(1 + \frac{C_{FIN}}{C_{FBP}}\right), V_{MOD} = V_{REFH} - V_{REFL} \quad (1)$$

In Equation 1, $C_{FIN}$ is capacitance between a finger or conductor and the touch sensor.

The integrator INT amplifies a difference between the output voltage $V_{OUTP}$ of the pre-amplifier PREAMP and the reference voltage $V_{REFI}$ of the integrator INT at a ratio of $\alpha = Cs/C_{FBI}$ corresponding to its gain and accumulates and integrates a voltage, sampled by the number of driving signals applied, into an integrated capacitor $C_{FBI}$. In this case, Cs is capacitance of a sampling capacitor, and $C_{FBI}$ is capacitance of the feedback capacitor of the integrator INT.

The integrator INT of FIG. 6 accumulates the output voltage of a previous amplifier through delta integration (DI) and double sampling (DS). DI is a scheme for integrating only a difference between touch data and non-touch data. In the DS scheme, the output voltage of the preamplifier PREAMP is sampled in the rising portion and falling portion of a driving signal applied to a touch sensor. The integrator INT according to an embodiment of the present disclosure may implement DS using a single-ended amplifier so that a circuit area is not increased due to DS.

The integrator INT includes a first sampling circuit SCC1, a second sampling circuit SCC2, the integrating capacitor $C_{FBI}$, and a second amplifier OPI.

The first and the second sampling circuits SCC1 and SCC2 are connected to the inverting input terminal − of the second amplifier OPI. A reset switch $SW_{RI}$ and the feedback capacitor $C_{FBI}$ are connected between the inverting input terminal − and output terminal of the second amplifier OPI. A reference voltage $V_{REFI}$ is supplied to the non-inverting input terminal + of the second amplifier OPI.

The reference voltages $V_{REFIH}$ and $V_{REFIL}$ of the first and the second sampling circuits SCC1 and SCC2 are set to the same voltage as the output voltage $V_{OUTP}$ of the pre-amplifier PREAMP in a non-touch input state. The reference voltage $V_{REFI}$ of the first and the second sampling circuits SCC1 and SCC2 is the same as the reference voltage $V_{REFI}$ of the second amplifier OPI. Accordingly, the integrator INT integrates only a difference between a voltage when a touch input is performed and a voltage in a non-touch state. As a result, the number of integrations of the integrator INT can be increased without an increase in capacitance of the integrated capacitor $C_{FBI}$.

The first sampling circuit SCC1 samples the output voltage $V_{OUTP}$ in the rising portion of the touch sensor driving signal $V_{MOD}$. The first sampling circuit SCC1 includes a $(1a)^{th}$ switch $SW_{11}$, a $(1b)^{th}$ switch $SW_{12}$, a $(2a)^{th}$ switch $SW_{21}$, a $(2b)^{th}$ switch $SW_{22}$, and a first sampling capacitor $C_{S1}$. The $(1a)^{th}$ and the $(1b)^{th}$ switches $SW_{11}$ and $SW_{12}$ are turned on/off in response to a first switch control signal SW1 shown in FIG. 7. The $(2a)^{th}$ and the $(2b)^{th}$ switches $SW_{21}$ and $SW_{22}$ are turned on/off in response to the second switch control signal SW2. The switch control signals $SW_{RP}$, $SW_{RI}$, SW1, SW2, SW3, and SW4 shown in FIG. 7 may be generated by the touch sensor control unit 114.

The $(1a)^{th}$ and the $(1b)^{th}$ switches $SW_{11}$ and $SW_{12}$ are simultaneously turned on prior to the rising portion of the touch sensor driving signal $V_{MOD}$ so the output voltage $V_{OUTP}$ is supplied to the first sampling capacitor $C_{S1}$ and sample the amount of charges of the touch sensor Cs in the rising portion of the touch sensor driving signal $V_{MOD}$. The $(2a)^{th}$ and the $(2b)^{th}$ switches $SW_{21}$ and $SW_{22}$ are turned on after the $(1a)^{th}$ and the $(1b)^{th}$ switches $SW_{11}$ and $SW_{12}$ are turned off in the rising portion of the touch sensor driving signal $V_{MOD}$. The $(2a)^{th}$ and $(2b)^{th}$ switches $SW_{21}$ and $SW_{22}$ supply the output voltage $V_{OUTP}$ to the feedback capacitor $C_{FBI}$ of the second amplifier OPI in the rising portion of the touch sensor driving signal $V_{MOD}$.

A voltage sampled in the rising portion of the touch sensor driving signal $V_{MOD}$ is $V_{OUTP} - V_{REFIH}$. If the output voltage $V_{OUTP}$ is the output voltage V1 of the pre-amplifier PREAMP in a non-touch state and the reference voltage $V_{REFIH}$ is set as the output voltage V1, $V_{OUTP} - V_{REFIH} = V1 - V1 = 0$. When a touch input is generated, the output voltage $V_{OUTP}$ becomes greater than the reference voltage $V_{REFIH}$.

The second sampling circuit SCC2 samples the output voltage $V_{OUTP}$ in the falling portion of the touch sensor driving signal $V_{MOD}$. The second sampling circuit SCC2 includes a $(3a)^{th}$ switch SW31, a $(3b)^{th}$ switch SW32, a $(4a)^{th}$ switch SW41, a $(4b)^{th}$ switch SW42, and a second sampling capacitor CS2. The (3a)th and the (3b)th switches $SW_{31}$ and $SW_{32}$ are turned on/off in response to a third switch control signal SW3 shown in FIG. 7. The (4a)th and the (4b)th switches $SW_{41}$ and $SW_{42}$ are turned on/off in response to a fourth switch control signal SW4. The $(3a)^{th}$ and the $(3b)^{th}$ switches $SW_{31}$ and $SW_{32}$ are turned on prior to the rising portion of the touch sensor driving signal $V_{MOD}$ and reset the voltage of the second sampling capacitor $C_{s2}$ to $V_{REFIL} - V_{REFI}$. The $(4a)^{th}$ and the $(4b)^{th}$ switches $SW_{41}$ and $SW_{42}$ are turned on prior to the falling portion of the touch sensor driving signal $V_{MOD}$ and supply the output voltage $V_{OUTP}$ to the feedback capacitor $C_{FBI}$ through the second sampling capacitor $C_{S2}$. A voltage sampled in the falling portion of the touch sensor driving signal $V_{MOD}$ is $V_{REFIL} - V_{OUTP}$. If the output voltage $V_{OUTP}$ is the output voltage V2 of the pre-amplifier PREAMP in a non-touch state, VREFI2−VOUTP=V2−V2=0. When a touch input is generated in the falling portion of the touch sensor driving signal $V_{MOD}$, the output voltage $V_{OUTP}$ becomes lower than the reference voltage $V_{REFIL}$ because it is a negative polarity voltage.

In accordance with an embodiment of the present disclosure, the integrator INT may be implemented as shown in FIG. 6 so that the integrator INT is able to integrate only a difference between a touch voltage and a non-touch voltage. Furthermore, the second amplifier OPI may be implemented to perform double sampling so that the first sampling circuit SCC1 and the second sampling circuit SCC2 alternately sample an input voltage. The integrator INT according to an embodiment of the present disclosure is not limited to a circuit, such as FIG. 6. For example, the integrator INT according to an embodiment of the present disclosure may be implemented using a simpler circuit for accumulating an input voltage only in the rising portion and falling portion of the touch sensor driving signal $V_{MOD}$.

If the capacitance value of the touch sensor, such as a large-screen display panel, is large, the output voltage $V_{OUTP}$ of the pre-amplifier PREAMP is increased and thus the output voltage $V_{OUTP}$ exceeds a permissible range defined in the specifications of the touch IC and may be saturated. In this case, it is not easy to determine a touch input because the output voltage $V_{OUTP}$ is the same or almost equal in a touch input and non-touch state. The charge removal unit ACR may be used to properly control the amount of charges of the touch sensor.

The charge removal unit ACR includes one or more capacitors $C_C$ and $C_F$ and first and second switches $SW_A$ and $SW_B$.

The electrodes of the capacitors $C_C$ and $C_F$ on one side of the capacitors are connected to the inverting input terminal − of the first amplifier OPP through the first switch $SW_A$. Furthermore, the electrodes of the capacitors $C_C$ and $C_F$ on one side of the capacitors are connected to the non-inverting input terminal + of the first amplifier OPP through the second switch $SW_B$. Charge removing pulse signals $V_{CR\_C}$ and $V_{CR\_F}$ for removing charges are supplied to the electrodes of the capacitors $C_C$ and $C_F$ on the other side of the capacitors during the touch input sensing portion TT1. In FIG. 8, $V_{CR}$ denotes the pulse signals $V_{CR\_C}$ and $V_{CR\_F}$ for removing charges in FIG. 7.

The first and the second switches $SW_A$ and $SW_B$ are alternately turned on under the control of the touch sensor control unit 114 as shown in FIG. 8 and are switched in opposite manners. In other words, when one of the first and the second switches $SW_A$ and $SW_B$ is turned on in response to switch control signals having opposite phases, the other of the first and the second switches $SW_A$ and $SW_B$ is turned off.

The second switch $SW_B$ is turned off at the same time as the first switch $SW_A$ is turned on at a timing prior to the falling edge of the pulse signals $V_{CR\_C}$ and $V_{CR\_F}$ for removing charges. In the on state of the first switch $SW_A$, the pulse signals $V_{CR\_C}$ and $V_{CR\_F}$ for removing charges having falling edges. As the number of such falling edges is increased, the cumulative number of controlled values of the output voltage $V_{OUTP}$ is increased.

When the charge removal unit ACR operates, the output voltage $V_{OUTP}$ of the pre-amplifier PREAMP is expressed by Equation 2 below. As may be seen from Equation 2, the charge removal unit ACR can reduce the output voltages of the amplifier PREAMP and the integrator INT within a range in which the range of an input voltage inputted to the ADC is satisfied while not increasing the size of the touch IC by taking into consideration a permissible range defined in the specifications of the touch IC.

$$V_{OUTP} = V_{REFH} \times V_{MOD} \times \left(1 + \frac{C_S + C_{CR}}{C_{FBP}}\right) - n \times V_{CR} \times \frac{C_{CR}}{C_{FBP}}, \quad (2)$$

$$V_{MOD} = V_{REFH} - V_{REFL}$$

In Equation 2, CCR is a capacitance of the capacitors $C_C$ and $C_F$. $C_S$ is capacitance of the touch sensor $C_S$. n is the number of pulse signals $V_{CR\_C}$ and $V_{CR\_F}$ for removing charges.

The touch sensor driving frequency is an operating frequency of the sensing unit 113. The operating frequency of the sensing unit 113 is the driving frequency of the integrator INT and the pre-amplifier PREAMP. More specifically, touch sensor driving frequency means an operating frequency of the switch elements $SW_{RP}$, $SW_{RI}$, and SW1-SW4. The switch elements $SW_{RP}$, $SW_{RI}$, and SW1-SW4 are synchronized with the same frequency and turned on/off. A touch sensor driving frequency described in a method of measuring noise in the touch sensor means the operating frequency of the switch elements $SW_{RP}$, $SW_{RI}$, and SW1-SW4. It should be noted that the operating frequency of the switch elements $SW_{RP}$, $SW_{RI}$, and SW1-SW4 is typically the same frequency as the frequency of, or proportional in frequency to, the touch driving signal $V_{MOD}$.

Figure 9:
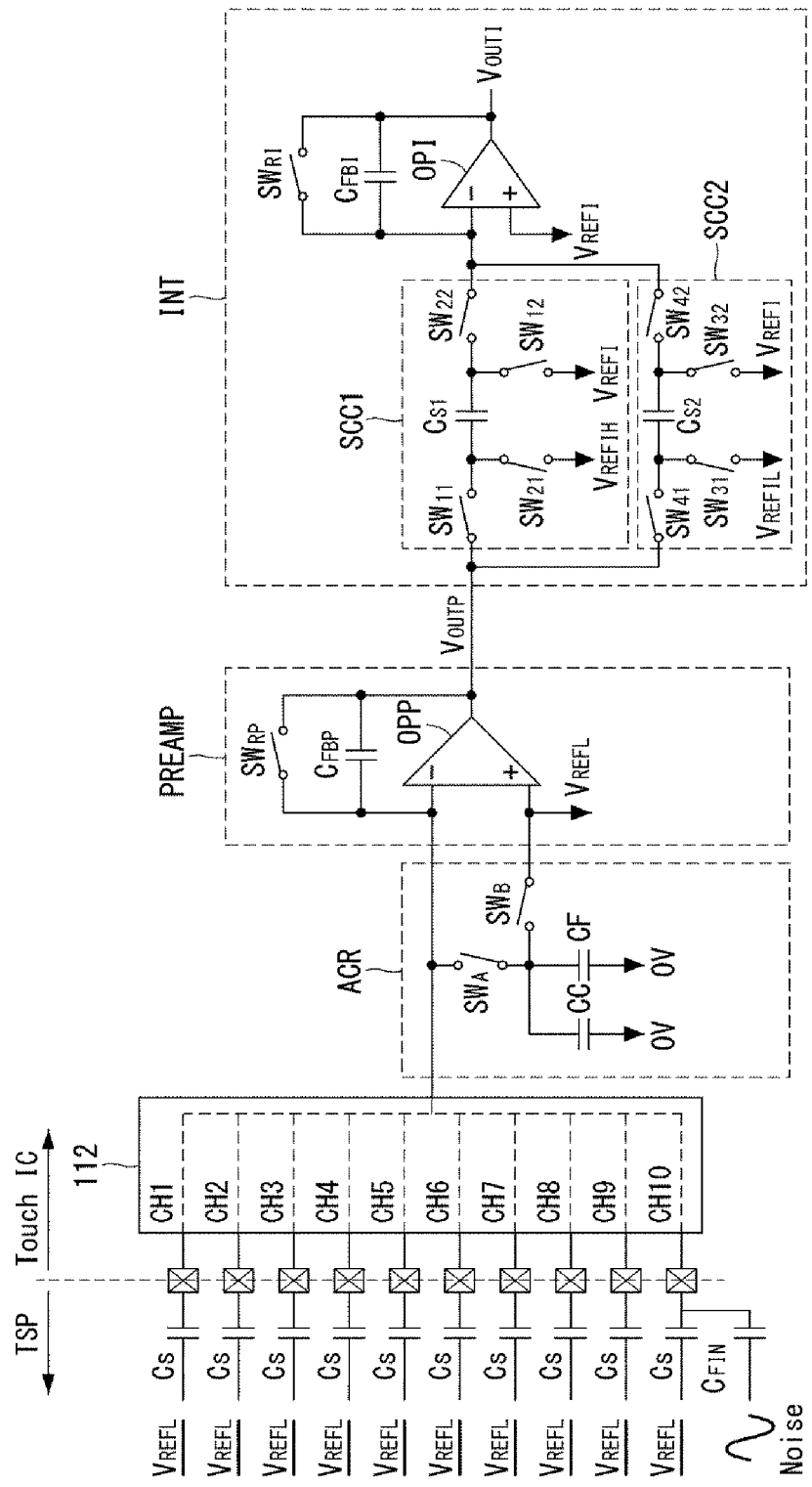
FIG. 9 is a diagram showing the operation of the touch sensor driving unit 110 in a noise measurement portion.
Figure 10A:
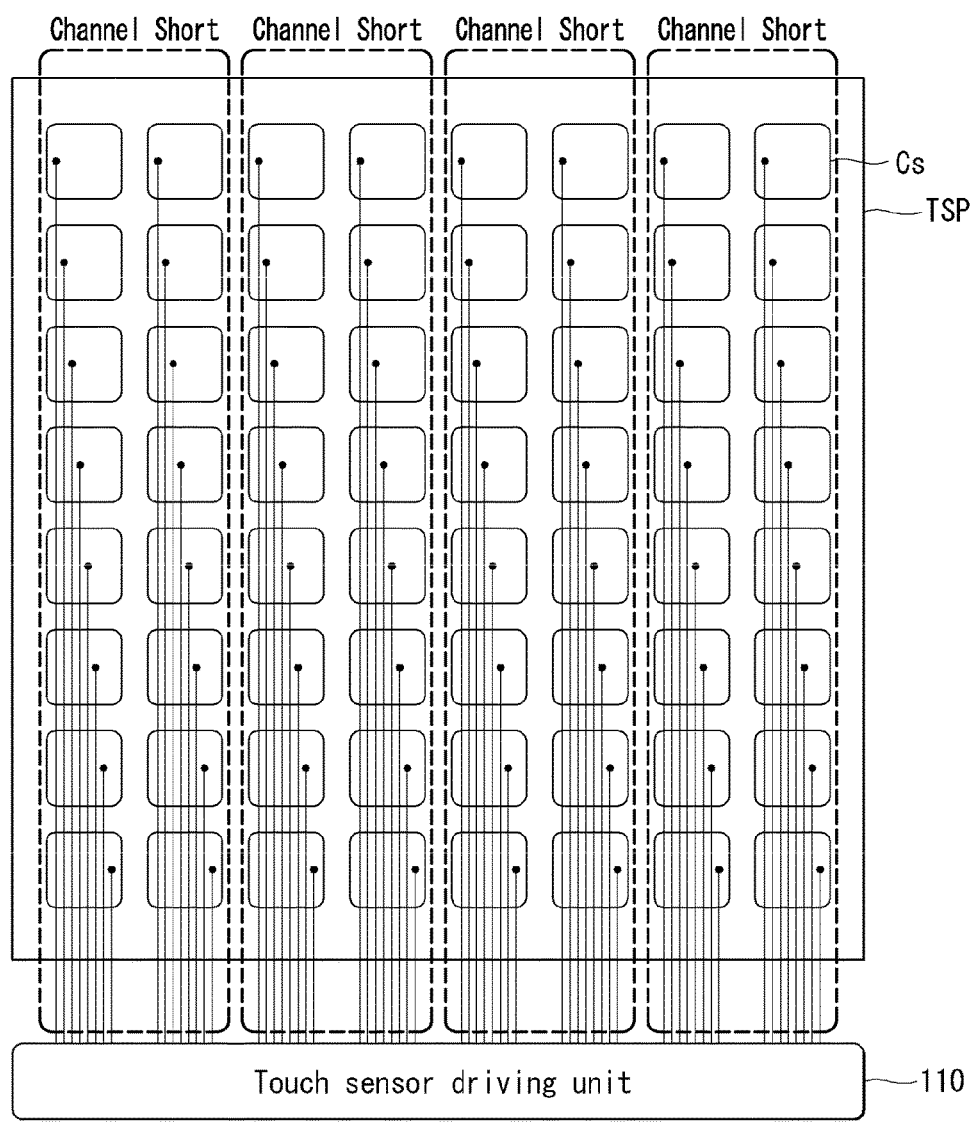
Figure 10C:
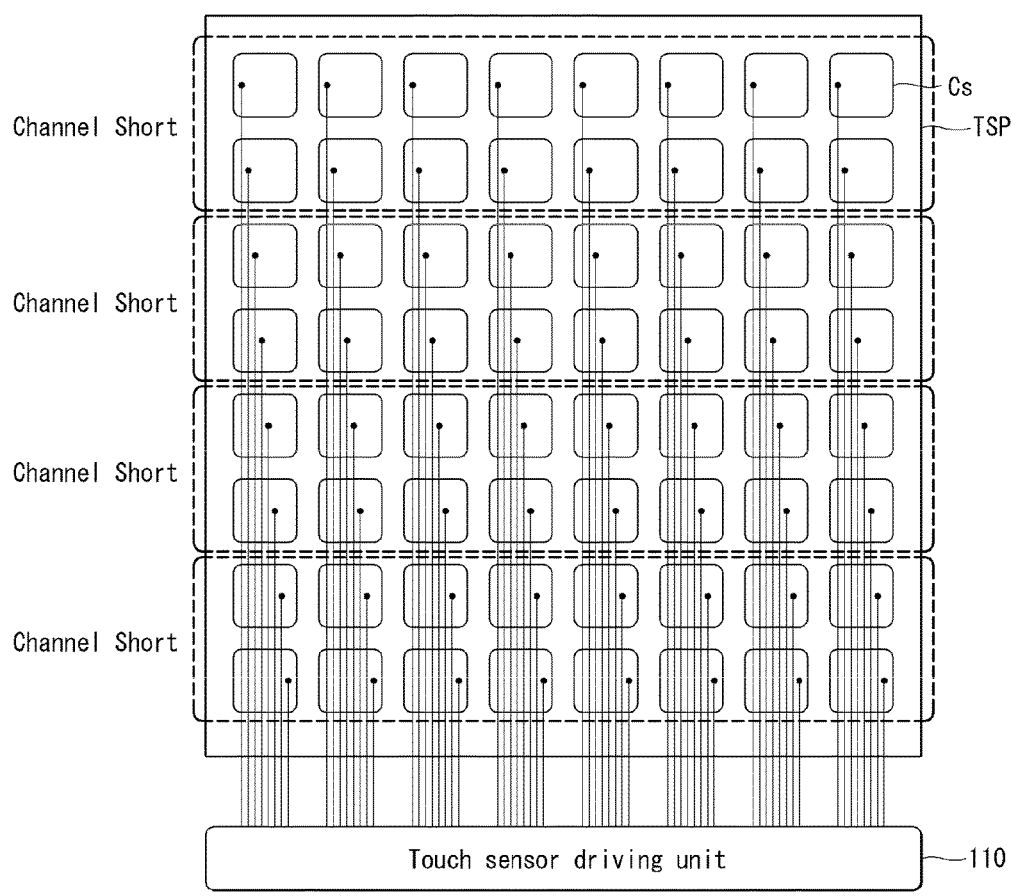
Figure 10D:
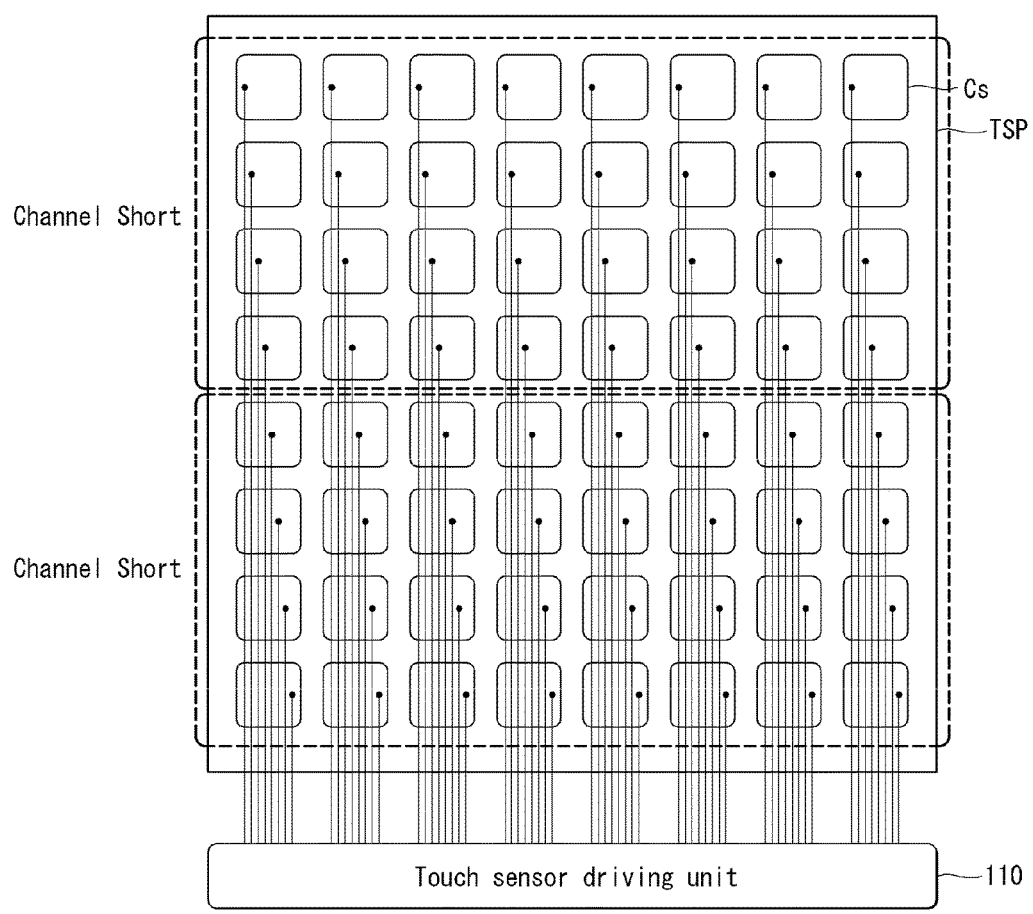
Figure 10E:
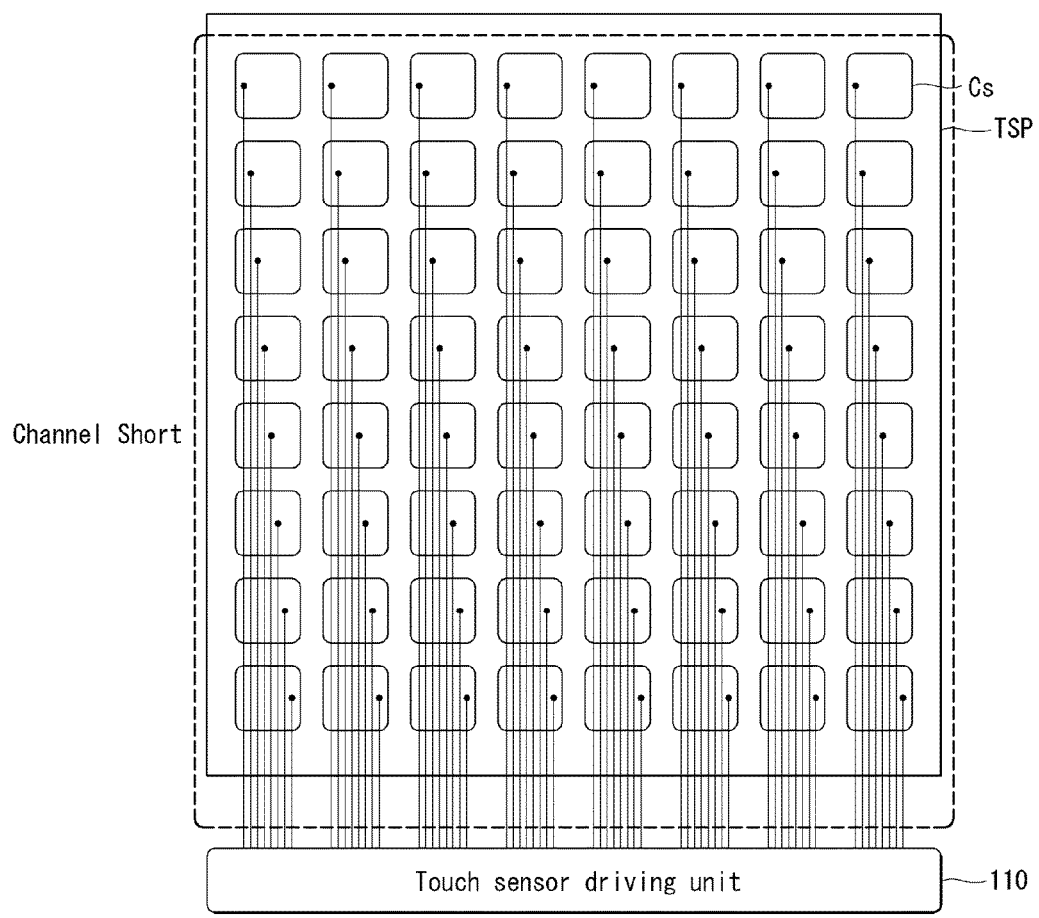
Figure 10F:
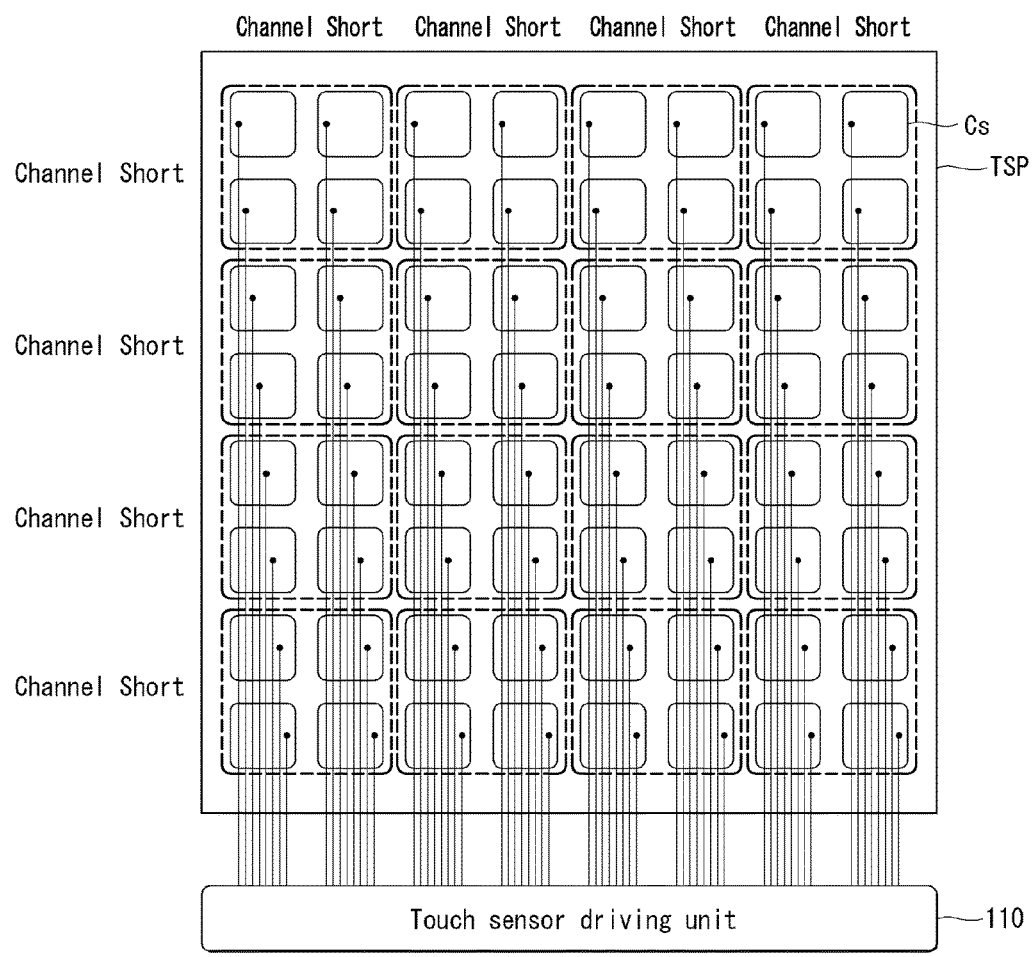

FIG. 9 is a diagram showing the operation of the touch sensor driving unit 110 in the noise measurement portion TT2.

Referring to FIG. 9, in accordance with an embodiment of the present disclosure, in the case of a self-capacitance type touch sensor, the touch sensor driving signal $V_{MOD}$ is not generated in order to measure noise using only the amount of charges introduced through a finger or a conductor other than the changes of touch sensors during the noise measurement portion TT2. During the noise measurement portion TT2, the sensing unit 113 operates in a currently set touch sensor driving frequency and senses noise introduced through the touch sensors. Charges, which are attributable to a fluorescent lamp or an electronic device, may flow into the sensing unit 113 through the touch sensors through a user's finger, and the charges introduced due to an external environment acts as noise for a touch sensor signal.

During the noise measurement portion TT2, the sensing unit 113 connects the two or more channels CH1-CH10 to the single pre-amplifier PREAMP and simultaneously measures noise introduced from an external environment through the touch sensors Cs connected to the two or more sensor lines 111. To this end, the multiplexer 112 short-circuits the two or more channels CH1-CH10 and connects the two or more channels CH1-CH10 to the inverting input terminal − of the pre-amplifier PREAMP. Accordingly, during the noise measurement portion TT2, only charges received through the touch sensors due to a finger or a conductor are inputted to the pre-amplifier PREAMP.

In order to amplify only the amount of charges introduced through a finger or a conductor, during the noise measurement portion TT2, the sensing unit 113 inputs a low voltage $V_{REFL}$ to the non-inverting input terminal + of the pre-amplifier PREAMP. The low voltage $V_{REFL}$ may be set as a DC voltage which is higher than 0 V and lower than the power supply voltage VDD. VDD is the power supply voltage between 3.3 V and 12 V. In accordance with an embodiment of the present disclosure, during the noise measurement portion TT2, reference voltages inputted to the capacitors $C_C$ and $C_F$ of the charge removal unit ACR are fixed to 0 V, and noise received through the touch sensors is measured. The integrator INT likewise operates in the touch input sensing portion TT1 and the noise measurement portion TT2, accumulates a noise voltage amplified by the pre-amplifier PREAMP, and sends the accumulated noise voltage to the ADC.

The sensing unit 113 converts an analog voltage, output by the integrator INT, into digital data through the ADC during the noise measurement portion TT2. During the noise measurement portion TT2, the touch sensor control unit 114 receives the digital data as current noise, compares the current noise with previous noise previously stored in memory, and changes a touch sensor driving frequency if, as a result of the comparison, the current noise is greater than the previous noise. In contrast, during the noise measurement portion TT2, the touch sensor control unit 114 receives the digital data as current noise, compares the current noise with previous noise previously stored in the memory, and maintains the current touch sensor driving frequency if, as a result of the comparison, the current noise is equal to or smaller than the previous noise.

When the charge removal unit ACR does not operate, the output voltage $V_{OUTP}$ of the pre-amplifier PREAMP is expressed by Equation 3 below.

$$V_{OUTP} = \Delta V_{noise} \times \left(\frac{C_{FIN}}{C_{FBP}}\right) + V_{REFL} \qquad (3)$$

In Equation 2, $C_{FIN}$ is capacitance between a finger or conductor and the touch sensor. $\Delta V_{noise}$ is the input voltage of the pre-amplifier PREAMP which is generated due to charges introduced through a finger or a conductor.

In accordance with an embodiment of the present disclosure, the time taken to measure noise can be reduced because noise introduced into the touch sensors due to a finger or a conductor is simultaneously measured during the noise measurement portion TT2 during which a plurality of sensor lines has been short-circuited by the multiplexer 112. Furthermore, in accordance with an embodiment of the present disclosure, even small amounts of noise can be measured because the amount of current flowing into the pre-amplifier PREAMP is increased by short-circuiting a plurality of sensor lines in order to increase a noise voltage.

FIGS. 10A to 10F are diagrams showing examples of various channel short-circuits of the sensing unit during the noise measurement portion.

In FIGS. 10A to 10F, the touch sensor driving unit 110 according to an embodiment of the present disclosure may connect a plurality of sensor lines to a single channel in the sensing unit 113 by short-circuiting the sensor lines using the multiplexer 112 in various ways. The touch sensor driving unit 110 may short-circuit all the sensor lines and simultaneously measure noise introduced through all the touch sensors Cs.

Figure 11:
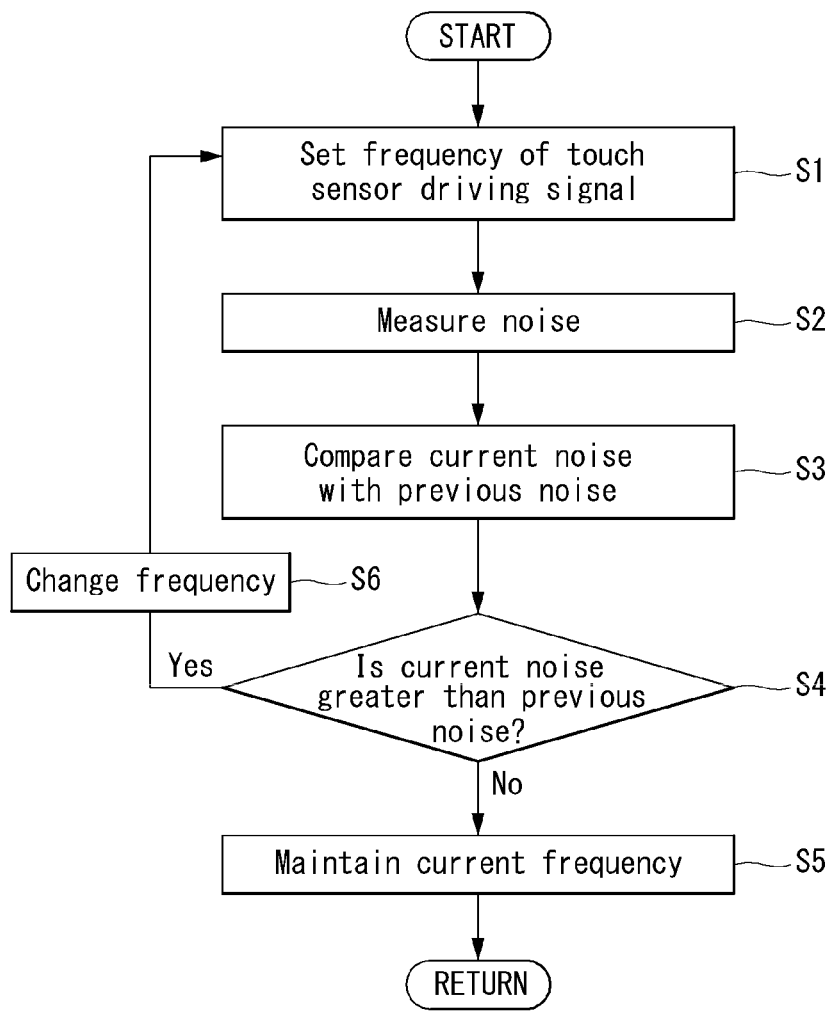
FIG. 11 is a flowchart illustrating sequence of control of a noise measurement method according to an embodiment step by step.
Figure 12A:
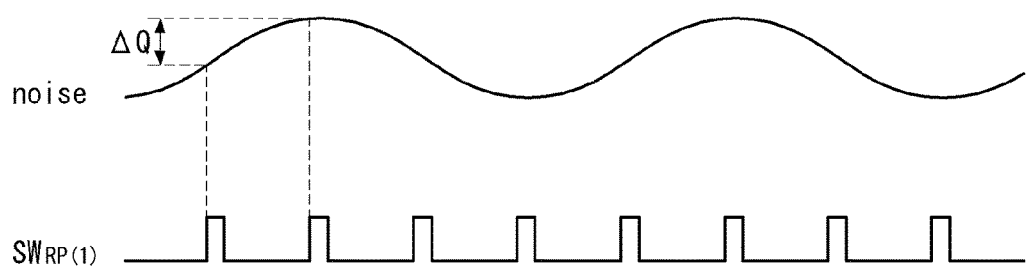
FIGS. 12a to 12c are diagrams showing noise measured according to a change of a touch sensor driving frequency.

FIG. 11 is a flowchart illustrating sequence of control of a noise measurement method according to an embodiment of the present disclosure step by step. FIGS. 12a and 12c are diagrams showing noise measured according to a change of a touch sensor driving frequency.

Referring to FIGS. 11 to 12c, the touch sensor control unit 114 senses the amount of charges of the touch sensors at a touch sensor driving frequency during the touch input sensing portion TT1 of the touch sensor driving period TT. Furthermore, the touch sensor control unit 114 measures noise by sensing the amount of charges of the touch sensors in the noise measurement portion TT2 using the touch sensor driving frequency maintained during the touch input sensing portion TT1 at steps S1 and S2.

In accordance with an embodiment of the present disclosure, noise measurement may be performed every frame period. Furthermore, noise in the touch sensors may be measured once in a specific time cycle, for example, in a cycle of several seconds. Noise may be measured right after the display device is turned on by a user, and noise may be measured again when power is on. Furthermore, when a power-off command for the display device is received from a user, power-off timing may be delayed, noise may be measured, a touch sensor driving frequency may be changed, and power may be then turned off. Furthermore, noise may be measured when a user requests a measurement through a user interface, and noise may be temporarily measured in standby mode. If noise is measured every frame period, a change of a noise environment can be rapidly handled. If noise is measured once in a specific time cycle or noise is measured when power is turned on/off, power consumption for noise measurement can be reduced.

A method of changing a noise detection frequency may be varied within the operating range of the touch sensor driving unit 110. Noise may be measured by repeating a process of sequentially raising and dropping a touch sensor driving frequency. For example, a touch sensor driving frequency may be changed from 80 Hz→90 Hz→100 Hz→110 Hz→100 Hz→90 Hz→80 Hz when noise is measured. For another example, a touch sensor driving frequency may be randomly changed when noise is measured. For example, a touch sensor driving frequency may be changed from 80 Hz→110 Hz→100 Hz→90 Hz.

If, as a result of the noise measurement, current noise is greater than previous noise at steps S3 and S4, the touch sensor control unit 114 changes the current touch sensor driving frequency using a predetermined frequency change method and repeats steps S1 to S4. In contrast, if, as a result of the noise measurement, the current noise is equal to or smaller than the previous noise, the touch sensor control unit 114 senses a touch input using a current frequency at step S5.

Figure 12B:
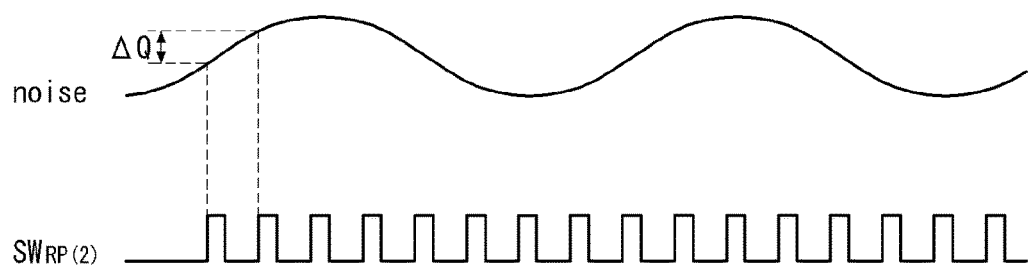
Figure 12C:
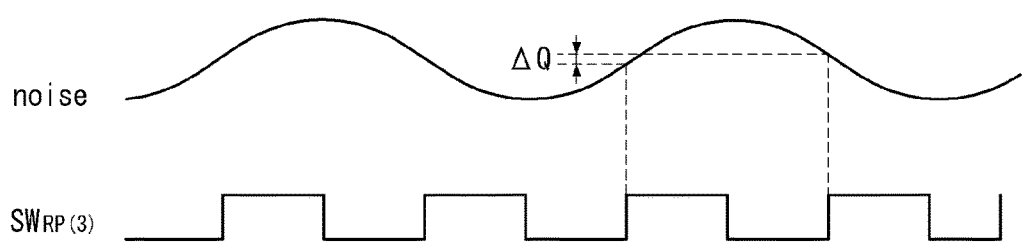

A noise level may vary depending on the frequency of the noise and a touch sensor driving frequency as shown in FIGS. 12a to 12c. For example, as shown in FIGS. 12a and 12c, when a touch sensor driving frequency is $SW_{RP(1)}$, the amount of charges $\Delta Q$ introduced from an external environment is increased compared to the case where a touch sensor driving frequency is $SW_{RP(2)}$ or $SW_{RP(3)}$. In this case, an embodiment of the present disclosure adjusts the touch sensor driving frequency to $SW_{RP(2)}$ or $SW_{RP(3)}$, and drives the touch sensors.

Figure 13:
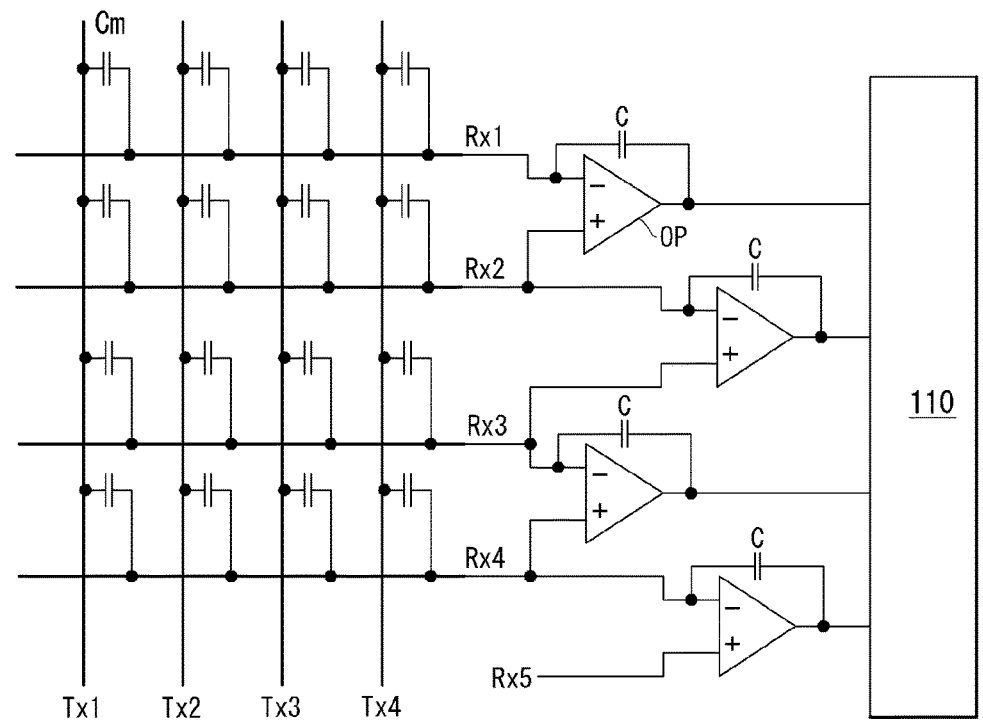
FIGS. 13 and 14 are diagrams showing a normal touch input sensing operation in mutual capacitance type touch sensors.
Figure 14:
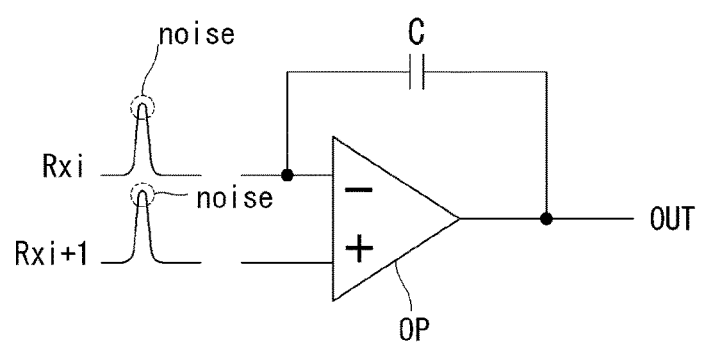
Figure 15:
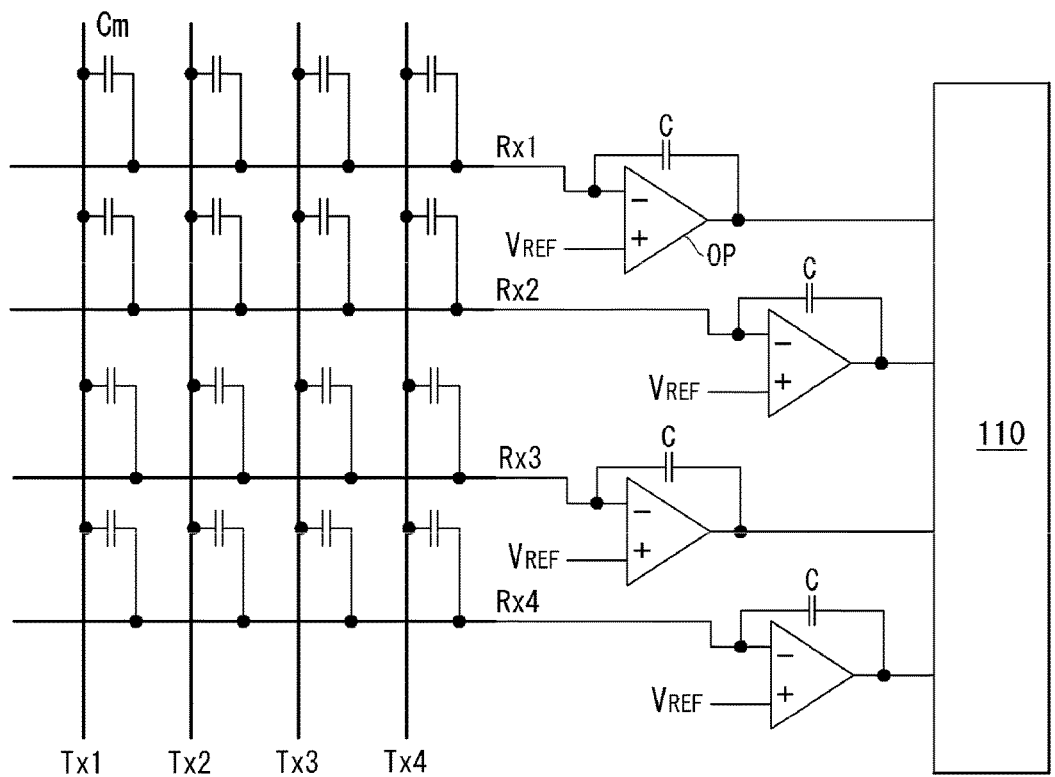
FIG. 15 is a diagram showing a noise measurement method in the mutual capacitance type touch sensors.

In the aforementioned embodiment of the present disclosure, the self-capacitance type touch sensors Cs have been chiefly illustrated, but the present disclosure is not limited thereto. FIGS. 13 to 15 are embodiments regarding mutual capacitance type touch sensors.

FIGS. 13 and 14 are diagrams showing a normal touch input sensing operation in mutual capacitance type touch sensors.

Referring to FIGS. 13 and 14, the sensor lines 111 include Tx lines Tx1~Tx4 and Rx lines Rx1~Rx4 which are orthogonal to each other with an insulating layer interposed between the Tx lines and the Rx lines. The mutual capacitance type touch sensors Cm are formed between the Tx lines Tx1~Tx4 and the Rx lines Rx1~Rx4.

The touch sensor driving unit 110 supplies the touch sensor driving signal to the Tx lines Tx1~Tx4, receives the amount of charges of the touch sensors Cm received through the Rx lines Rx1~Rx4 in synch with the touch sensor driving signal, and amplifies and integrates the amount of the charges. When a touch input is generated through a finger or a conductor, the amount of charges of the touch sensors is reduced. Accordingly, the mutual capacitance type touch sensors may determine a touch input based on a difference between the amount of charges before the touch input and the amount of charges after the touch input.

Differential amplifiers OP may be connected to the Rx lines Rx1~Rx4. The sensing unit 113 may receive a signal amplified by the differential amplifier OP connected to two adjacent Rx lines. The output terminal of each differential amplifier OP is connected to the inverting input terminal − of the differential amplifier OP via a capacitor C. The differential amplifiers OP amplify a difference between an $i^{th}$ (i is a positive integer) touch sensor signal inputted to the inverting input terminal − of the differential amplifiers OP and an $(i+1)^{th}$ touch sensor signal inputted to the non-inverting input terminal + of the differential amplifiers OP and outputs an $i^{th}$ sensor signal. As shown in FIG. 14, the differential amplifier OP amplifies a difference between signals received through adjacent Rx lines so that a signal component becomes greater than noise. Accordingly, the SNR can be improved.

The differential amplifiers OP may reduce noise received through the touch sensors Cm during the touch input sensing portion TT1, but makes noise measurement difficult.

Figure 16:
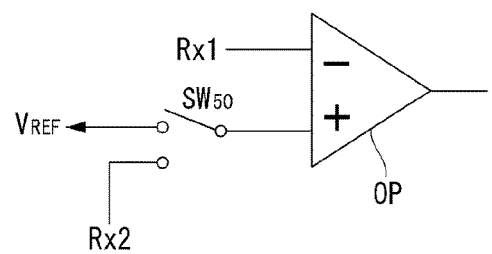
FIG. 16 is a diagram showing a switch connected to a differential amplifier shown in FIGS. 13 and 14.

In accordance with an embodiment of the present disclosure, in order to prevent a phenomenon in which noise becomes too small when noise is measured, a specific reference voltage $V_{REF}$ is supplied to the non-inverting terminal + of each differential amplifier OP as shown in FIGS. 15 and 16. A switch $SW_{50}$ may be connected to the non-inverting input terminal + of the differential amplifier OP as shown in FIG. 16. The switch $SW_{50}$ connects the Rx line to the non-inverting input terminal + of the differential amplifier OP in the touch input sensing portion TT1 and supplies a DC reference voltage $V_{REF}$ to the non-inverting input terminal + of the differential amplifier OP in the noise measurement portion TT2. The reference voltage $V_{REF}$ may be set as a voltage of 3.3 V~12 V.

When noise is measured, a touch sensor driving signal is not applied to the Tx lines Tx1~Tx4 in order to measure only noise introduced into the touch sensors through a finger or a conductor other than the amount of charges charged in the touch sensors.

Figure 17:
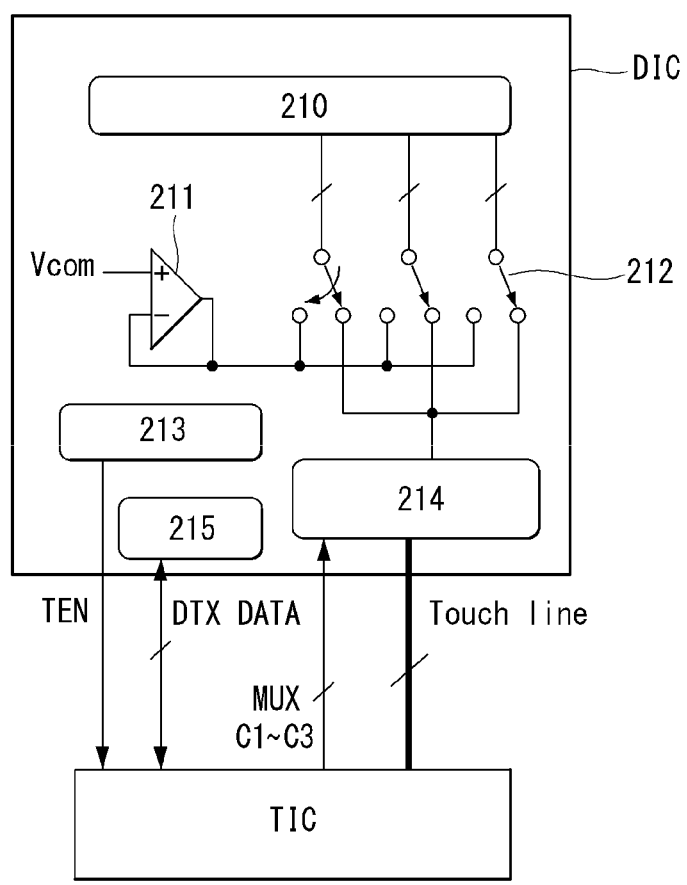
FIGS. 17 to 19 are diagrams showing a driving device according to an embodiment.
Figure 18:
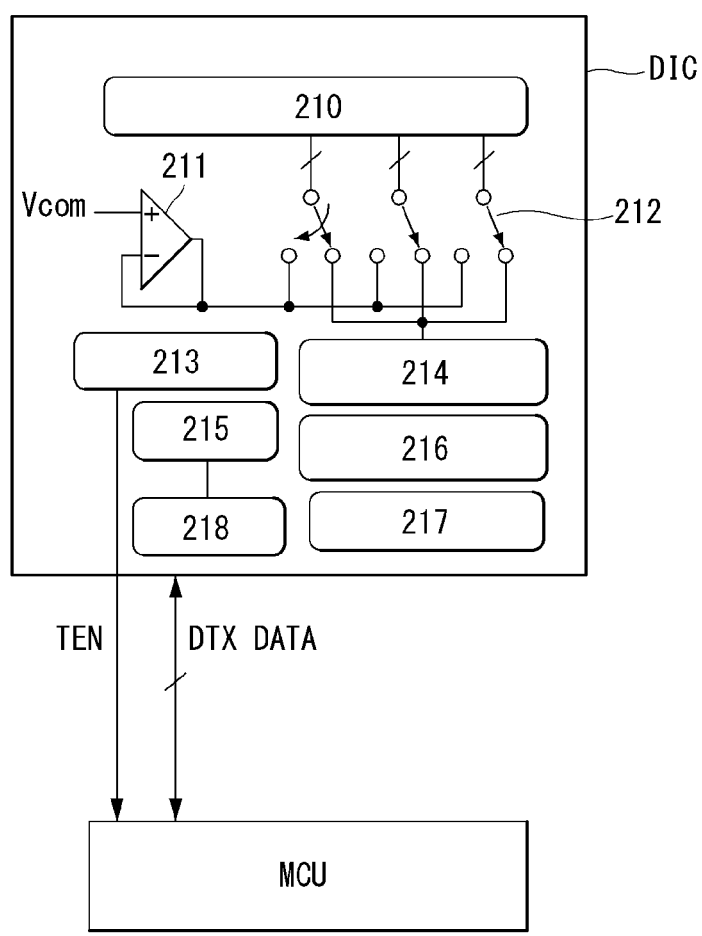
Figure 19:
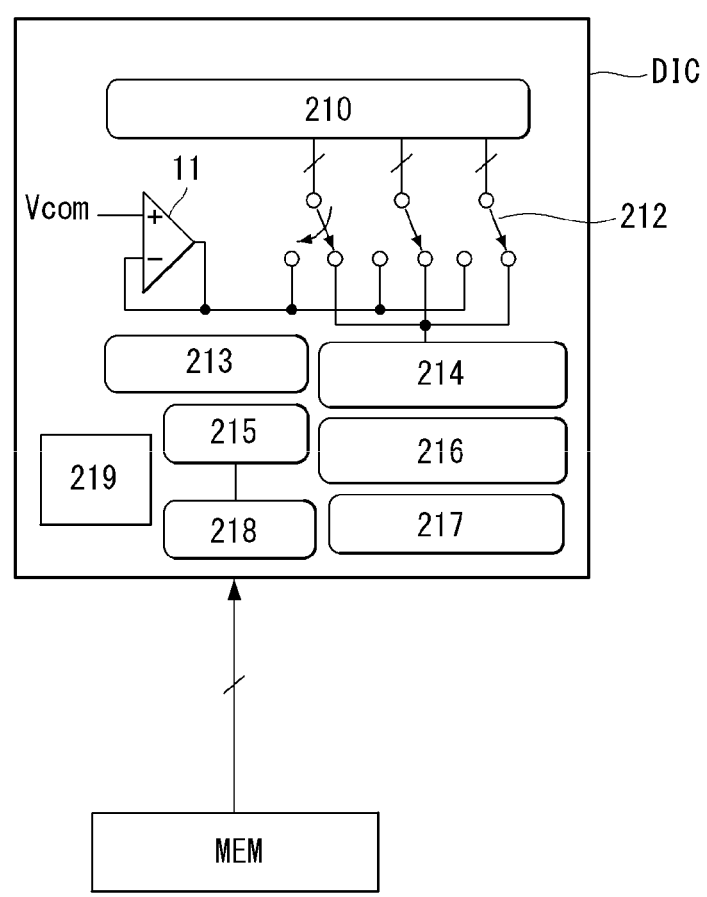

The driving circuit of the display device including the display driving circuit 102, 104, and 106 and the touch sensor driving unit 110 may be implemented in various ways. FIGS. 17 to 19 show examples in which the driving circuit has been applied to a mobile device.

Referring to FIG. 17, the driving circuit includes a drive IC (DIC) and a touch IC (TIC).

The DIC includes a touch sensor channel unit 210, a Vcom buffer 211, a switch array 212, a timing control signal generation unit 213, a multiplexer 214, and a DTX compensation unit 215.

The touch sensor channel unit 210 is connected to the electrodes of the touch sensors Cs and Cm through the sensor lines 111 and is connected to the Vcom buffer 211 and the multiplexer 214 through the switch array 212. The multiplexer 214 connects the sensor lines 111 to the TIC. In the case of a 1:3 multiplexer, the multiplexer 214 connects one channel of the TIC to three sensor lines 111 in a time-division way, thereby reducing the number of channels of the TIC. The multiplexer 214 selects sensing lines to be connected to a channel of the TIC in response to MUX control signals MUX C1~C3. The multiplexer 214 is connected to the channels of the TIC through touch lines.

The Vcom buffer 211 outputs the common voltage Vcom of pixels. The switch array 212 supplies the common voltage Vcom from the Vcom buffer 211 to the touch sensor channel unit 210 during the display period TD under the control of the timing control signal generation unit 213. The switch array 212 connects the sensor line 111 to the TIC during the touch sensor driving period TT under the control of the timing control signal generation unit 213.

The timing control signal generation unit 213 generates timing control signals for controlling operating timing of the display driving circuit 102, 104, and 106 and the TIC. The display driving circuit 102, 104, and 106 writes the data of an input image in the pixels as described above. The data driving unit 102 generates a data voltage for the input image and supplies the data voltage to the data lines 101 of the display panel 100. The data driving unit 102 may be integrated in the DIC. The gate driving unit 104 sequentially supplies the gate lines 103 of the display panel 100 with a gate pulse (or scan pulse) synchronized with the data voltage. The gate driving unit 104 may be directly formed in a substrate in which the pixel array has been disposed.

The timing control signal generation unit 213 is substantially the same as the timing control signal generation unit of the timing controller 106 shown in FIG. 1. The timing control signal generation unit 213 drives the display driving circuit 102, 104, and 106 during the display period TD and drives the TIC during the touch sensor driving period TT.

The timing control signal generation unit 213 synchronizes the display driving circuit 102, 104, and 106 and the TIC by generating the touch enable signal TEN defining the display period TD and the touch sensor driving period TT. The display driving circuit 102, 104, and 106 writes data in the pixels during the first level period of the touch enable signal TEN. The TIC drives the touch sensors Cs and Cm in response to the second level of the touch enable signal TEN and senses a touch input. As in the examples of FIGS. 4A to 4C, the first level of the touch enable signal TEN may be a low level, and the second level thereof may be a high level and vice versa.

Noise may be increased in the touch sensor signal depending on a change of the data of an input image. The DTX compensation unit 215 analyzes the data of an input image and removes noise of touch data which varies depending on a change of gradation of the input image. Touch data output by the DTX compensation unit 215 is sent to the TIC. DTX means a display and touch crosstalk. The DTX compensation unit 215 may use a DTX compensation algorithm disclosed in Korean Patent Application Publication No. 10-2014-0079689 of the present applicant.

If parasitic capacitance connected to the touch sensor is minimized by applying the AC signal LFD having the same phase as the touch sensor driving signal to the data lines 101 and the gate lines 103 during the touch sensor driving period TT, DTX can be minimized. Accordingly, if such a technology is applied, noise of the touch sensors is not changed sensitively depending on a change of the data of an input image because parasitic capacitance between the pixels and the touch sensors can be minimized. In this case, the DTX compensation unit 215 may be omitted. In FIG. 17, DTX DATA is the output data of the DTX compensation unit 15.

The TIC drives the multiplexer 214 during the touch portion in response to the touch enable signal TEN from the timing control signal generation unit 213 and receives the charges of the touch sensors Cs and Cm through the multiplexer 214 and the sensor lines 111.

The TIC detects the amount of charges before and after a touch input based on a signal received by a touch sensor, compares the amount of the charges with a specific threshold value, and determines the position of a touch sensor in which the amount of charges is greater than the threshold value as a touch input area. The TIC calculates the coordinates of each touch input and sends touch data, including touch input coordinate information, to the external host system 108. The TIC includes an amplifier for amplifying the charges of touch sensors, an integrator for accumulating the charges received from the touch sensors, an ADC for converting the voltage of the integrator into digital data, and an operation logic unit. The operation logic unit executes a touch sensing algorithm for comparing touch data output by the ADC with a threshold value, determining a touch input based on a result of the comparison, and calculating coordinates.

The DIC and the TIC may send and receive signals through a serial peripheral interface (SPI).

Referring to FIG. 18, a driving circuit includes a DIC and a micro controller unit (MCU).

The DIC includes a touch sensor channel unit 210, a Vcom buffer 211, a switch array 212, a first timing control signal generation unit 213, a multiplexer 214, a DTX compensation unit 215, a sensing unit 216, a second timing control signal generation unit 217, and memory 218. The present embodiment is different from the embodiment of FIG. 17 in that the sensing unit 216 and the second timing control signal generation unit 217 are integrated in the DIC. The first timing control signal generation unit 213 is substantially the same as that of FIG. 17. Accordingly, the first timing control signal generation unit 213 generates timing control signals for controlling operating timing of the display driving circuit 102, 104, and 106 and the TIC.

The sensing unit 216 includes an amplifier for amplifying the charges of touch sensors, an integrator for accumulating the charges received from the touch sensors, and an ADC for converting the voltage of the integrator into digital data. Touch data output by the ADC is sent to the MCU. The second timing control signal generation unit 217 generates timing control signals and clocks for controlling the multiplexer 214 and operating timing of the sensing unit 216. The DTX compensation unit 215 is omitted from the DIC. The memory 218 temporarily stores touch data under the control of the second timing control signal generation unit 217.

The DIC and the MCU may send and receive signals through a serial peripheral interface (SPI). The MCU executes a touch recognition algorithm for comparing touch data with a threshold value, determining a touch input based on a result of the comparison, and calculating coordinates.

Referring to FIG. 19, a driving circuit includes a DIC and memory MEM.

The DIC includes a touch sensor channel unit 210, a Vcom buffer 211, a switch array 212, a first timing control signal generation unit 213, a multiplexer 214, a DTX compensation unit 215, a sensing unit 216, a second timing control signal generation unit 217, memory 218, and an MCU 219. The present embodiment is different from the embodiment of FIG. 18 in that the MCU 219 has been integrated in the DIC. The MCU 219 executes a touch sensing algorithm for comparing touch data with a threshold value, determining a touch input based on a result of the comparison, and calculating coordinates.

The memory MEM stores a register setting value regarding timing information for the operations of the display driving circuit 102, 104, 108 and the sensing unit 16. When a display device is power on, a register setting value from the memory MEM is loaded onto the first timing control signal generation unit 216 and the second timing control signal generation unit 217. The first timing control signal generation unit 216 and the second timing control signal generation unit 217 generates timing control signals for controlling the display driving circuit 102, 104, and 106 and the sensing unit 216 based on the register setting value read from the memory MEM. Accordingly, a change of a model can be handled by changing a register setting value stored in the memory MEM without a structural change of a driving device.

As described above, in accordance with an embodiment of the present disclosure, the time taken to measure noise and current consumption can be reduced because two or more touch sensors are short-circuited during a touch noise measurement portion and noise is simultaneously measured through the touch sensors. Furthermore, in accordance with an embodiment of the present disclosure, when noise is measured, noise can be measured more easily because the amount of current flowing into an amplifier is increased by short-circuiting a plurality of sensor lines.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensitive display device comprising:
a display panel comprising at least a first touch sensor and a second touch sensor; and touch driving circuitry to:
supply one or more touch sensor driving signals to the first touch sensor and the second touch sensor during a touch sensing period; and
supply a reference voltage different from the touch sensor driving signals to the first touch sensor and the second touch sensor to measure a first electrical noise from the first touch sensor and the second touch sensor during a noise measurement period,
wherein the display panel is driven in a display period for image display and a touch period for touch sensing,
wherein the touch driving circuitry supplies the one or more touch sensor driving signals and senses touch during a touch sensing portion of the touch period, and
wherein the noise measurement period is a portion of the touch period.

2. The touch sensitive display device of claim 1, wherein the reference voltage is simultaneously supplied to the first touch sensor and the second touch sensor during the noise measurement period.

3. The touch sensitive display device of claim 1, wherein the first touch sensor and the second touch sensor are selectively shorted together during the noise measurement period to measure the first electrical noise from the first touch sensor and the second touch sensor.

4. The touch sensitive display device of claim 1, wherein the touch driving circuitry is to:
supply the reference voltage to the first touch sensor and the second touch sensor to measure a second electrical noise from the first touch sensor and the second touch sensor during another noise measurement period;
compare the first electrical noise to the second electrical noise; and
adjust an operating frequency of the touch driving circuitry based on the comparison of the first electrical noise to the second electrical noise.

5. The touch sensitive display device of claim 4, wherein the first electrical noise is measured by the touch driving circuitry while the touch driving circuitry is operating at a first frequency, and the second electrical noise is measured by the touch driving circuitry while the touch driving circuitry is operating at a second frequency different than the first frequency.

6. The touch sensitive display device of claim 4, wherein the operating frequency of the touch driving circuitry is a frequency at which one or more switches in the touch driving circuitry are turned on and off.

7. The touch sensitive display device of claim 1, wherein the reference voltage is a specific DC reference voltage.

8. A driver circuit for a display panel that comprises at least a first touch sensor and a second touch sensor, the driver circuit comprising:
  touch driving circuitry to:
    supply one or more touch sensor driving signals to the first touch sensor and the second touch sensor during a touch sensing period; and
    supply a reference voltage different from the touch sensor driving signals to the first touch sensor and the second touch sensor to measure a first electrical noise from the first touch sensor and the second touch sensor during a noise measurement period,
  wherein the display panel is driven in a display period for image display and a touch period for touch sensing,
  wherein the touch driving circuitry supplies the one or more touch sensor driving signals and senses touch during a touch sensing portion of the touch period, and
wherein the noise measurement period is a portion of the touch period.

9. The driver circuit of claim 8, wherein the reference voltage is simultaneously supplied to the first touch sensor and the second touch sensor during the noise measurement period.

10. The driver circuit of claim 8, wherein the first touch sensor and the second touch sensor are selectively shorted together during the noise measurement period to measure the first electrical noise from the first touch sensor and the second touch sensor.

11. The driver circuit of claim 8, wherein the touch driving circuitry is to:
  supply the reference voltage to the first touch sensor and the second touch sensor to measure a second electrical noise from the first touch sensor and the second touch sensor during another noise measurement period;
  compare the first electrical noise to the second electrical noise; and
  adjust an operating frequency of the touch driving circuitry based on the comparison of the first electrical noise to the second electrical noise.

12. The driver circuit of claim 11, wherein the first electrical noise is measured by the touch driving circuitry while the touch driving circuitry is operating at a first frequency, and the second electrical noise is measured by the touch driving circuitry while the touch driving circuitry is operating at a second frequency different than the first frequency.

13. The driver circuit of claim 11, wherein the operating frequency of the touch driving circuitry is a frequency at which one or more switches in the touch driving circuitry are turned on and off.

14. The driver circuit of claim 8, wherein the reference voltage is a specific DC reference voltage.

15. A method of operating a display device having a display panel being driven in a display period for image display and a touch period for touch sensing, the method comprising:
  supplying one or more touch sensor driving signals to a first touch sensor and a second touch sensor of the display panel during a touch sensing portion of the touch period; and
  supplying a reference voltage different from the touch sensor driving signals to the first touch sensor and the second touch sensor to measure a first electrical noise from the first touch sensor and the second touch sensor during a noise measurement period,
  wherein the noise measurement period is a portion of the touch period.

16. The method of claim 15, wherein the reference voltage is simultaneously supplied to the first touch sensor and the second touch sensor during the noise measurement period.

17. The method of claim 15, further comprising:
  selectively shorting together the first touch sensor and the second touch sensor during the noise measurement period to measure the first electrical noise from the first touch sensor and the second touch sensor.

18. The method of claim 15, further comprising:
  supplying the reference voltage to the first touch sensor and the second touch sensor to measure a second electrical noise from the first touch sensor and the second touch sensor during another noise measurement period;
  comparing the first electrical noise to the second electrical noise; and
  adjusting an operating frequency of touch driving circuitry that supplies the reference voltage and the one or more touch driving signals, the operating frequency adjusted based on the comparison of the first electrical noise to the second electrical noise.

19. The method of claim 18, wherein the first electrical noise is measured while the touch driving circuitry is operating at a first frequency, and the second electrical noise is measured while the touch driving circuitry is operating at a second frequency different than the first frequency.

20. The method of claim 18, wherein the operating frequency of the touch driving circuitry is a frequency at which one or more switches in the touch driving circuitry are turned on and off.

21. The method of claim 15, wherein the reference voltage is a specific DC reference voltage.

* * * * *